United States Patent
Myman

(10) Patent No.: US 10,387,674 B2
(45) Date of Patent: Aug. 20, 2019

(54) SYSTEMS AND METHODS OF TRANSFORMING ELECTRONIC CONTENT

(71) Applicant: DatChat, Inc., New Brunswick, NJ (US)

(72) Inventor: Darin Myman, New Brunswick, NJ (US)

(73) Assignee: DatChat, Inc., New Brunswick, NJ (US)

(*) Notice: Subject to any disclaimer, the term of this patent is extended or adjusted under 35 U.S.C. 154(b) by 23 days.

(21) Appl. No.: 15/174,204

(22) Filed: Jun. 6, 2016

(65) Prior Publication Data

US 2016/0357946 A1    Dec. 8, 2016

Related U.S. Application Data

(60) Provisional application No. 62/170,900, filed on Jun. 4, 2015.

(51) Int. Cl.
| | |
|---|---|
| *H04N 21/8358* | (2011.01) |
| *G06F 21/62* | (2013.01) |
| *G06F 21/60* | (2013.01) |
| *G06F 21/16* | (2013.01) |

(52) U.S. Cl.
CPC ........ *G06F 21/6245* (2013.01); *G06F 21/606* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,523,113 | B1* | 2/2003 | Wehrenberg | G11B 20/00086 380/201 |
| 6,661,904 | B1* | 12/2003 | Sasich | G06T 1/005 375/E7.089 |
| 7,257,234 | B2* | 8/2007 | Kesal | G06F 21/16 340/5.8 |
| 8,953,795 | B2* | 2/2015 | Singer | G06F 21/10 380/202 |

(Continued)

OTHER PUBLICATIONS

Efficient Data Hiding Using Cryptogrpahy and Stenography. Oluwakemi. IJIAS. (Year: 2012).*

(Continued)

*Primary Examiner* — Venkat Perungavoor
(74) *Attorney, Agent, or Firm* — McCarter & English, LLP

(57) ABSTRACT

Exemplary embodiments are directed to systems and methods of transforming electronic content. Exemplary embodiments can electronically capture or receive a first electronic content and a second electronic content with a first electronic device. Exemplary embodiments can execute an assignment function to designate the first electronic content as a hidden electronic content and to designate the second electronic content as a cover electronic content. Exemplary embodiments can execute an encryption function that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is viewable at a location of a graphical user interface.

23 Claims, 27 Drawing Sheets

(56) References Cited

U.S. PATENT DOCUMENTS

| | | | |
|---|---|---|---|
| 2003/0009671 A1* | 1/2003 | Yacobi | G06T 1/005 713/176 |
| 2003/0103645 A1* | 6/2003 | Levy | G06F 17/30876 382/100 |
| 2003/0159035 A1* | 8/2003 | Orthlieb | G06F 21/121 713/168 |
| 2003/0177400 A1* | 9/2003 | Raley | G06F 21/10 713/168 |
| 2004/0199771 A1* | 10/2004 | Morten | H04L 9/083 713/176 |
| 2007/0014429 A1* | 1/2007 | He | G06F 17/212 382/100 |
| 2007/0019836 A1* | 1/2007 | Thorwirth | G06T 1/0028 382/100 |
| 2008/0130883 A1* | 6/2008 | Agaian | G06T 1/0028 380/54 |
| 2008/0301767 A1* | 12/2008 | Picard | G06T 1/0042 726/2 |
| 2010/0074443 A1* | 3/2010 | Ishii | G09C 5/00 380/243 |
| 2015/0095645 A1* | 4/2015 | Eldar | G06F 21/6209 713/168 |
| 2016/0063269 A1* | 3/2016 | Liden | G06F 21/6218 726/26 |
| 2016/0241895 A1* | 8/2016 | Mohacs | G06F 21/105 |

OTHER PUBLICATIONS

CryptMark: A Novel Secure Invisible Watermarking Technique for Color Images. Mohanty et al. (Year: 2007).*

* cited by examiner

SYSTEMS AND METHODS OF TRANSFORMING ELECTRONIC CONTENT

CROSS-REFERENCE TO RELATED APPLICATIONS

The present application claims the benefit of a U.S. Provisional Patent Application No. 62/170,900, which was filed on Jun. 4, 2015. The entire content of the foregoing provisional application is incorporated herein by reference.

TECHNICAL FIELD

The present disclosure relates to systems and methods of transforming electronic content and, in particular, to systems and methods of encrypting electronic content to provide confidential saving and/or sharing of the electronic content.

BACKGROUND

Photographs and videos have been used historically to capture still images and dynamic content. With the advent of portable electronic devices, such as smart phones or tablets, sharing of captured image and video content (and text messages) has increased significantly. Sharing of content through portable electronic devices has also resulted in increased privacy concerns, including privacy regarding content stored on a user's own device and privacy regarding control of what happens with content shared to another user, such as a friend.

Thus, a need exists for systems and methods of transforming electronic content on a device that provides security for content saved on the device and/or shared with other users. A further need exits for systems and methods of transforming electronic content to permit confidential saving and/or sharing of the electronic content. These and other needs are addressed by the systems and methods of transforming electronic content of the present disclosure.

SUMMARY

In accordance with embodiments of the present disclosure, exemplary methods of transforming electronic content are provided. The methods include electronically capturing or receiving a first electronic content and a second electronic content with a first electronic device, e.g., a computer, a smart phone, a tablet, or the like. The methods further include programmatically executing an assignment function with an assignment engine to designate the first electronic content as a hidden electronic content and to designate the second electronic content as a cover electronic content. The methods include programmatically executing an encryption function with an encryption engine that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is viewable at a location of a graphical user interface (GUI), e.g., at the first electronic device, the second electronic device, or both. The location of the GUI can be, for example, a camera roll located on the first and/or second electronic device.

The first electronic content and the second electronic content can be at least one of, e.g., a photograph, a video, text, combinations thereof, or the like. In some embodiments, the first and second electronic content can be the same type of content. In some embodiments, the first and second electronic content are not the same type of content. The methods include programmatically executing a transmission function with a transmission engine to transmit the encrypted electronic content and the decryption key to a second electronic device. The second electronic device can include a GUI.

The methods include programmatically executing on the second electronic device a decryption function with a decryption engine that receives as input the encrypted electronic content and a decryption key, and that outputs the hidden electronic content to the GUI of the second electronic device. In some embodiments, the methods include programmatically executed on the first electronic device a decryption function with a decryption engine that receives as input the encrypted electronic content and the decryption key, and that outputs the hidden electronic content to a second location of the GUI of the first electronic device.

In some embodiments, executing the decryption function to output the hidden electronic content can include providing a physical input from a user on the GUI of the second electronic device, e.g., through a touch screen of the GUI, with an input device, or the like. In some embodiments, the physical input from the user can include a touch and hold at a single point of the GUI. In some embodiments, the physical input from the user can include a touch and a hold at four or more different points on the GUI. The physical input from the user can prevent the user from capturing a snapshot or screenshot of the GUI showing the hidden electronic content.

The methods include storing the encrypted electronic content in an electronic content database associated with the first electronic device. The encrypted electronic content can be viewable on the GUI of the first electronic device at a second location, e.g., through an application interface of the disclosed system.

In some embodiments, the methods can include programmatically executing a distribution rights function with a distribution rights engine to assign one or more distribution rights to the encrypted electronic content. The methods can include programmatically executing the transmission function with the transmission engine to transmit the encrypted content to the second electronic device, the distribution rights limiting or preventing distribution of the encrypted electronic content from the second electronic device to a third electronic device.

In some embodiments, the methods can include programmatically executing a viewing rights function with a viewing rights engine to assign one or more viewing rights to the encrypted electronic content. The viewing rights can designate at least one of a time limit for viewing the encrypted electronic content, or a number of permitted views of the encrypted electronic content. In some embodiments, the methods can include programmatically executing a viewing rights function with a viewing rights engine to assign a download preference to the encrypted electronic content. The download preference can indicate whether the recipient of the encrypted electronic content can download the encrypted electronic content to the recipient's electronic device. The viewing rights can be selected by the user prior to encryption such that the viewing rights are incorporated directly into the encrypted electronic content.

In some embodiments, the methods can include programmatically executing a self-destruct function with a self-destruct engine upon reaching at least one of the time limit, or the number of permitted views assigned to the encrypted electronic content by the viewing rights function. The self-destruct function can include removing or altering the decryption key associated with the encrypted electronic content to prevent decryption of the encrypted electronic content. Executing the self-destruct function can permanently prevent viewing the hidden electronic content via the GUI, while permitting viewing of the cover electronic content via the GUI. In some embodiments, the self-destruct function can automatically delete or erase all data associated with the encrypted electronic content (e.g., both the hidden electronic content and the cover electronic content) from the electronic device.

In accordance with embodiments of the present disclosure, exemplary non-transitory computer-readable medium storing instructions are provided that are executable by a processing device. Execution of the instructions by the processing device can cause the processing device to electronically capture or receive a first electronic content and a second electronic content with a first electronic device. Execution of the instructions by the processing device can cause the processing device to programmatically execute an assignment function with an assignment engine to designate the first electronic content as a hidden electronic content and to designate the second electronic content as a cover electronic content. Execution of the instructions by the processing device can cause the processing device to programmatically execute an encryption function with an encryption function that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is viewable at a location on a GUI.

Execution of the instructions by the processing device can cause the processing device to programmatically execute a transmission function with a transmission engine to transmit the encrypted electronic content and the decryption key to a second electronic device. The second electronic device can include a GUI. Execution of the instructions by the processing device (e.g., of the first electronic device and/or the second electronic device) can cause the processing device to programmatically execute a decryption function with a decryption engine that receives as input the encrypted electronic content and the decryption key, and that outputs the hidden electronic content.

In some embodiments, execution of the instructions by the processing device can cause the processing device to programmatically execute a distribution rights function with a distribution rights engine to assign distribution rights to the encrypted electronic content. Execution of the instructions by the processing device can cause the processing device to programmatically execute a transmission function with a transmission engine to transmit the encrypted electronic content to a second electronic device, the distribution rights limiting or preventing distribution of the encrypted electronic content from the second electronic device to a third electronic device.

In some embodiments, execution of the instructions by the processing device can cause the processing device to programmatically execute a viewing rights function with a viewing rights engine to assign viewing rights to the encrypted electronic content. The viewing rights can at least one of designate a time limit for viewing the encrypted electronic content, or designate a number of permitted views of the encrypted electronic content. In some embodiments, execution of the instructions by the processing device can cause the processing device to execute a self-destruct function upon at least one of reaching the time limit, or reaching the number of permitted views. The self-destruction function can remove or alter the decryption key associated with the encrypted electronic content to prevent decryption of the encrypted electronic content.

In accordance with embodiments of the present disclosure, exemplary systems of transforming electronic content are provided. The systems include a first electronic device and a second electronic device. The first electronic device can include a first GUI, a first non-transitory computer-readable medium, and a first processing device. The second electronic device can include a second GUI, a second non-transitory computer-readable medium, and a second processing device. The first processing device of the first electronic device can be configured to programmatically execute instructions stored in the first non-transitory computer-readable medium to electronically capture or receive a first electronic content and a second electronic content with the first electronic device. The first processing device of the first electronic device can be configured to execute instructions stored in the first non-transitory computer-readable medium to programmatically execute an assignment function with an assignment engine to designate the first electronic content as a hidden electronic content and to designate the second electronic content as a cover electronic content.

The first processing device of the first electronic device can be configured to execute instructions stored in the first non-transitory computer-readable medium to programmatically execute an encryption function with an encryption engine that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is visible. The first processing device of the first electronic device can be configured to execute instructions stored in the first non-transitory computer-readable medium to programmatically execute a transmission function with a transmission engine to transmit the encrypted electronic content and the decryption key to the second electronic device.

The second processing device of the second electronic device can be configured to execute instructions stored in the second non-transitory computer-readable medium to electronically receive the encrypted electronic content and the decryption key from the first electronic device. The second processing device of the second electronic device can be configured to execute instructions stored in the second non-transitory computer-readable medium to programmatically execute a decryption function with a decryption engine that receives as input the encrypted electronic content and the decryption key, and that outputs the hidden electronic content.

The first processing device of the first electronic device can be configured to execute instructions stored in the first non-transitory computer-readable medium to programmatically execute a distribution rights function with a distribution rights engine to assign distribution rights to the encrypted electronic content. The distribution rights can limit or prevent distribution of the encrypted electronic content from the second electronic device to a third electronic device. The first processing device of the first electronic device can be configured to execute instructions stored in the first non-transitory computer-readable medium to programmatically execute a viewing rights function with a viewing rights engine to assign viewing rights to the encrypted electronic content. The viewing rights at least one of designate a time limit for viewing the encrypted electronic content, or designate a number of permitted views of the encrypted electronic content.

The second processing device of the second electronic device can be configured to execute instructions stored in the second non-transitory computer-readable medium to programmatically execute a self-destruct function upon at least one of reaching the time limit, or reaching the number of permitted views. The self-destruction function can remove or alter the decryption key associated with the encrypted electronic content to prevent decryption of the encrypted electronic content.

In accordance with embodiments of the present disclosure, exemplary methods of transforming electronic content are provided. The methods include electronically capturing or receiving a first electronic content and a second electronic content with a first electronic device. The methods include programmatically executing an assignment function with an assignment engine to designate the first electronic content as a hidden electronic content and to designate the second electronic content as a cover electronic content. The methods include programmatically executing an encryption function with an encryption engine that receives as input the hidden electronic content and the cover electronic content, and that outputs an encrypted electronic content and a decryption key. The encrypted electronic content can overlay the cover electronic content over the hidden electronic content such that prior to decryption only the cover electronic content is visible.

The methods include programmatically executing a transmission function with a transmission engine to transmit the encrypted electronic content and the decryption key to a second electronic device. The second electronic device can include a GUI. The methods include programmatically executing a decryption function with a decryption engine on the second electronic device that receives as input the encrypted electronic content and the decryption key, and that outputs the hidden electronic content. Executing the decryption function on the second electronic device can include providing a physical input from a user at four or more different points on the GUI.

In some embodiments, the methods can include programmatically executing a distribution rights function with a distribution rights engine to assign distribution rights to the encrypted electronic content. The distribution rights can limit or prevent distribution of the encrypted electronic content from the second electronic device to a third electronic device, e.g., from a second user to a third user. In some embodiments, the methods can include programmatically executing a viewing rights function with a viewing rights engine to assign viewing rights to the encrypted electronic content. The viewing rights can at least one of designate a time limit for viewing the encrypted electronic content, or designate a number of permitted views of the encrypted electronic content.

In some embodiments, the methods can include programmatically executing a self-destruction function with a self-destruct engine upon at least one of reaching the time limit, or reaching the number of permitted views. The self-destruction function can remove or alter the decryption key associated with the encrypted electronic content to prevent decryption of the encrypted electronic content.

In accordance with embodiments of the present disclosure, exemplary non-transitory computer-readable medium storing instructions that are executable by a processing device are provided. Execution of the instructions by the processing device can cause the processing device to electronically capture or receive a first electronic content and a second electronic content with the first electronic device. Execution of the instructions by the processing device can cause the processing device to programmatically execute an assignment function with an assignment engine to designate the first electronic content as a hidden electronic content and to designate the second electronic content as a cover electronic content. Execution of the instructions by the processing device can cause the processing device to programmatically execute an encryption function with an encryption engine that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is viewable or visible.

Execution of the instructions by the processing device can cause the processing device to programmatically transmit the encrypted electronic content and the decryption key to a second electronic device. The second electronic device can include a GUI. Execution of the instructions by the processing device can cause the processing device to programmatically execute a decryption function with a decryption engine on the second electronic device that receives as input the encrypted electronic content and the decryption key, and that outputs the hidden electronic content. Executing the decryption function on the second electronic device can include providing a physical input from a user at four or more different points on the GUI.

In some embodiments, execution of the instructions by the processing device can cause the processing device to programmatically execute a distribution rights function with a distribution rights engine to assign distribution rights to the encrypted electronic content. The distribution rights can limit or prevent distribution of the encrypted electronic content from the second electronic device to a third electronic device. In some embodiments, execution of the instructions by the processing device can cause the processing device to programmatically execute a viewing rights function with a viewing rights engine to assign viewing rights to the encrypted electronic content. The viewing rights at least one of designate a time limit for viewing the encrypted electronic content, or designate a number of permitted views of the encrypted electronic content.

In some embodiments, execution of the instructions by the processing device can cause the processing device to programmatically execute a self-destruct function with a self-destruct engine upon at least one of reaching the time limit, or reaching the number of permitted views. The self-destruct function can remove or alter the decryption key associated with the encrypted electronic content to prevent decryption of the encrypted electronic content.

In accordance with embodiments of the present disclosure, exemplary systems of transforming electronic content are provided. The systems include a first electronic device and a second electronic device. The first electronic device can include a first GUI, a first non-transitory computer-readable medium, and a first processing device. The second electronic device can include a second GUI, a second non-transitory computer-readable medium, and a second processing device.

The processing device of the first electronic device can be configured to execute instructions stored in the first non-transitory computer-readable medium to electronically capture or receive a first electronic content and a second electronic content with the first electronic device. The processing device of the first electronic device can be configured to execute instructions stored in the first non-transitory computer-readable medium to programmatically execute an assignment function with an assignment engine to designate the first electronic content as a hidden electronic content and to designate the second electronic content as a cover electronic content.

The processing device of the first electronic device can be configured to execute instructions stored in the first non-transitory computer-readable medium to programmatically execute an encryption function with an encryption engine that receives as input the hidden electronic content and the cover electronic content, and that outputs an encrypted electronic content and a decryption key. The encrypted electronic content can overlay the cover electronic content over the hidden electronic content such that, prior to decryption, only the cover electronic content is visible. The processing device of the first electronic device can be configured to execute instructions stored in the first non-transitory computer-readable medium to programmatically execute a transmission function with a transmission engine to transmit the encrypted electronic content and the decryption key to a second electronic device. The second electronic device can include a GUI.

The second processing device of the second electronic device can be configured to execute instructions stored in the second non-transitory computer-readable medium to electronically receive the encrypted electronic content and the decryption key from the first electronic device. The second processing device of the second electronic device can be configured to execute instructions stored in the second non-transitory computer-readable medium to programmatically execute a decryption function with a decryption engine on the second electronic device that receives as input the encrypted electronic content and the decryption key, and that outputs the hidden electronic content. Executing the decryption function on the second electronic device can include providing a physical input from a user at four or more different points on the second GUI.

The processing device of the first electronic device can be configured to execute instructions stored in the first non-transitory computer-readable medium to programmatically execute a distribution rights function with a distribution rights engine to assign distribution rights to the encrypted electronic content. The distribution rights can limit or prevent distribution of the encrypted electronic content from the second electronic device to a third electronic device. The processing device of the first electronic device can be configured to execute instructions stored in the first non-transitory computer-readable medium to programmatically execute a viewing rights function with a viewing rights engine to assign viewing rights to the encrypted electronic content. The viewing rights at least one of designate a time limit for viewing the encrypted electronic content, or designate a number of permitted views of the encrypted electronic content.

The second processing device of the second electronic device can be configured to execute instructions stored in the second non-transitory computer-readable medium to programmatically execute a self-destruct function with a self-destruct engine upon at least one of reaching the time limit, or reaching the number of permitted views. The self-destruction function can remove or alter the decryption key associated with the encrypted electronic content to prevent decryption of the encrypted electronic content.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed systems and methods of transforming electronic content, reference is made to the accompanying figures, wherein.

DETAILED DESCRIPTION

Exemplary embodiments of the present disclosure are directed to systems and methods of transforming electronic content on a device in a way that provides security for the electronic content saved on the device and/or shared with other users. The exemplary systems and methods encrypt the electronic content such that, prior to decryption, the hidden electronic content is overlaid or covered by the cover electronic content. The exemplary systems and methods further provide means for sharing electronic content in a confidential manner and limiting distribution and/or viewing rights of the user receiving the electronic content (e.g., making the electronic content to be shared ephemeral).

Figure 1:
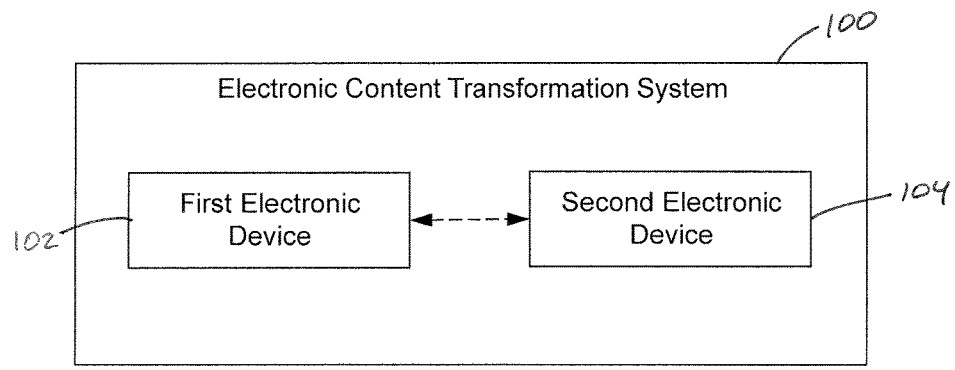
FIG. 1 is a block diagram of an electronic content transformation system in accordance with exemplary embodiments of the present disclosure.

FIG. 1 is a block diagram of an exemplary electronic content transformation system 100 (hereinafter "system 100"). The system 100 can include a first electronic device 102 and a second electronic device 104 communicatively linked relative to each other through a communications network, e.g., a wireless network, a wired network, or the like, shown by the dashed line. The communications network provides a means for electronic data to be transferred between the first and second electronic devices 102, 104. In some embodiments, the first and second electronic device 102, 104 can be, e.g., a computer, a smart phone, a tablet, or the like. Although illustrated as including two electronic devices, it should be understood that the system 100 can include two or more electronic devices.

Figure 2:
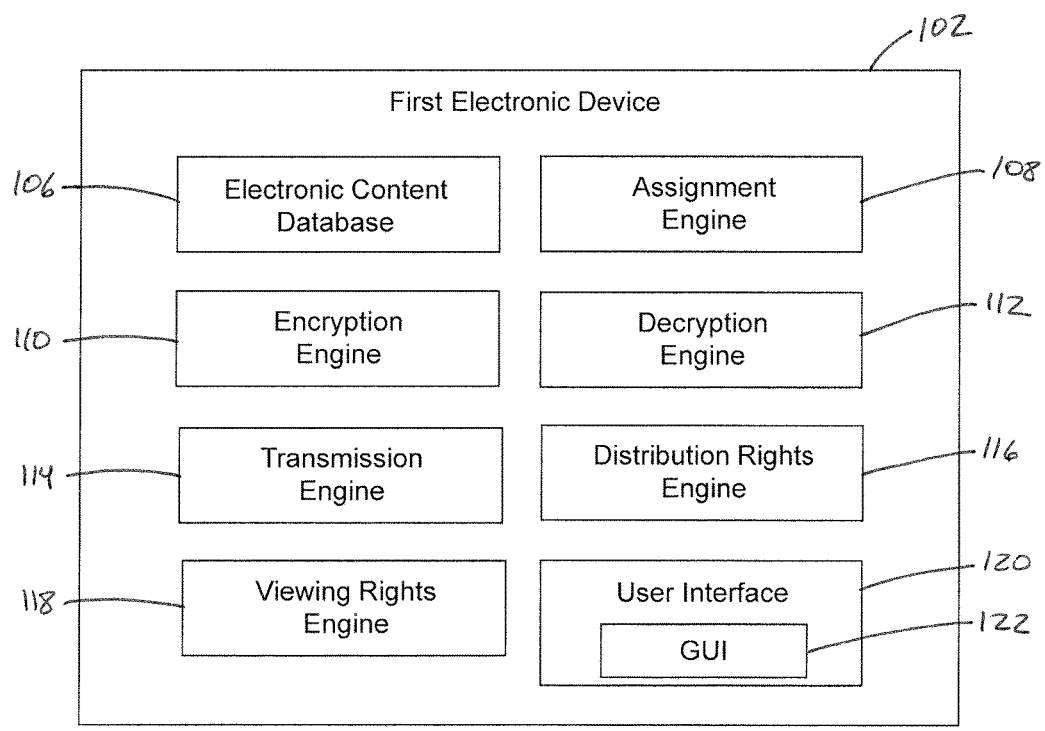
FIG. 2 is a block diagram of a first electronic device of an electronic content transformation system in accordance with exemplary embodiments of the present disclosure.

FIG. 2 is a block diagram of the first electronic device 102 of the system 100. The first electronic device 102 can include an electronic content database 106 for storing a variety of electronic content, such as photographs, videos, texts, combinations thereof, or the like, captured or received at the first electronic device 102. The first electronic device 102 can include an assignment engine 108, an encryption engine 110, a decryption engine 112, and a transmission engine 114. In some embodiments, the first electronic device 102 can include a distribution rights engine 116 and a viewing rights engine 118. The first electronic device 102 can include a user interface 120 including a graphical user interface (GUI) 122. The GUI 122 can be used to generate and/or view electronic content, and to implement the engines 108-118 of the first electronic device 102. The engines 108-118 can be used by the first electronic device 102 to generate encrypted electronic content to be sent to other users and/or to store within the electronic content database 106.

The assignment engine 108 can programmatically execute an assignment function to designate a first electronic content as the hidden electronic content and to designate a second electronic content as the cover electronic content. The encryption engine 110 can be used to encrypt the hidden and cover electronic content to generate an encrypted electronic content and an associated decryption key. In some embodiments, the encryption can be via, e.g., RSA encryption, layered encryption security (LES), or the like. The encrypted electronic content can include the cover electronic content overlaid to hide the hidden electronic content from view prior to decryption. The decryption engine 112 can be used to decrypt the encrypted electronic content with the appropriate decryption key such that the hidden electronic content can be viewed.

The transmission engine 114 can be used to transmit the encrypted electronic content and the associated decryption key to the second electronic device 104. The distribution rights engine 116 can be used to assign one or more distribution rights to the encrypted electronic content. The distribution rights can limit or prevent distribution of the encrypted electronic content from the second electronic device 104 to a third electronic device, e.g., distribution the encrypted electronic content to other users. The viewing rights engine 118 can be used to assign one or more viewing rights to the encrypted electronic content. The viewing rights can limit, e.g., the time limit for viewing the encrypted electronic content, the number of permitted times the encrypted electronic content can be viewed, a download limit of the encrypted electronic content to an electronic device of the recipient, combinations thereof, or the like. The operation of the engines 108-118 will be discussed in greater detail below.

Figure 3:
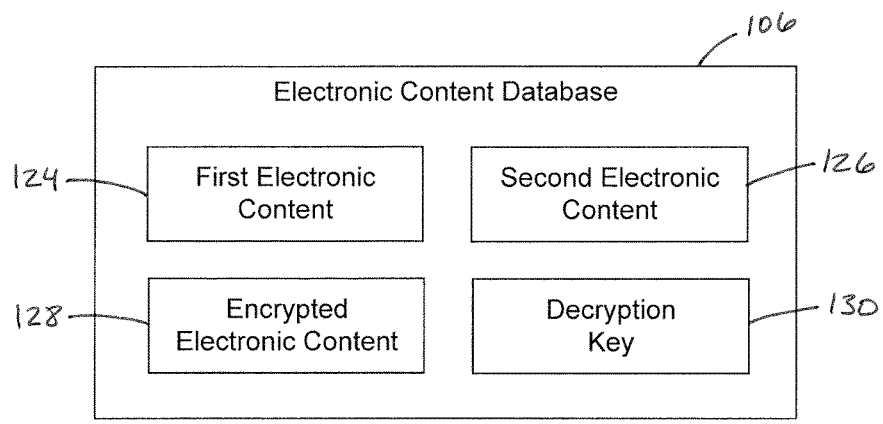
FIG. 3 is a block diagram of an electronic content database of a first electronic device in accordance with embodiments of the present disclosure.

FIG. 3 is a block diagram of the electronic content database 106 of the first electronic device 102. The electronic content database 106 can electronically store therein first electronic content 124 and second electronic content 126. The first and second electronic content 124, 126 can be, e.g., a photograph, a video, a text, combinations thereof, or the like. It should be understood that the electronic content database 106 can store a larger number of electronic content. The first and second electronic content 126 can be captured by a user through an electronic capture means of the first electronic device 102, such as a camera or a keyboard, or can be received by the first electronic device 102 from another device.

The electronic content database 106 can electronically store therein encrypted electronic content 128 and one or more decryption keys 130. As will be discussed in greater detail below, the encryption engine 110 of the first electronic device 102 can be used to generate the encrypted electronic content 128 and the decryption key 130 associated with the encrypted electronic content 128. In particular, each decryption key 130 can be generated specifically for decryption of the encrypted electronic content 128.

Figure 4:
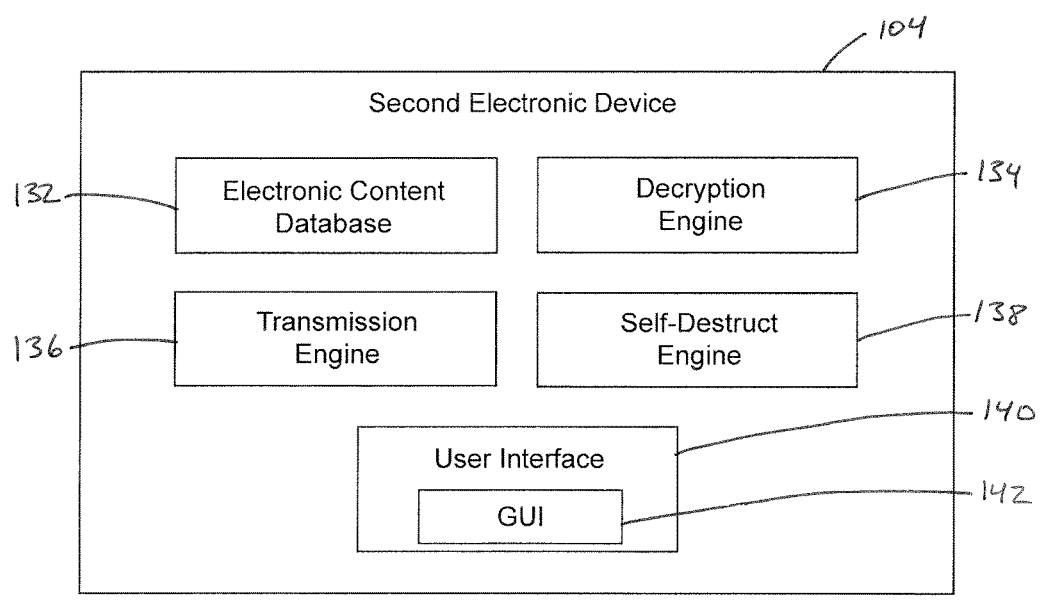
FIG. 4 is a block diagram of a second electronic device of an electronic content transformation system in accordance with exemplary embodiments of the present disclosure.

FIG. 4 is a block diagram of the second electronic device 104. The second electronic device 104 can include an electronic content database 132 for storing a variety of electronic content, such as photographs, videos, texts, combinations thereof, or the like, captured or received at the second electronic device 104. For example, the electronic content database 132 can store electronic content sent from the first electronic device 102. The second electronic device 104 can include a decryption engine 134 and a transmission engine 136. In some embodiments, the second electronic device 104 can include a self-destruct engine 138. The second electronic device 104 can include a user interface 140 including a GUI 142. The GUI 142 can be used to generate and/or view electronic content, and to implement the engines 134-138 of the first electronic device 102.

Figure 5:
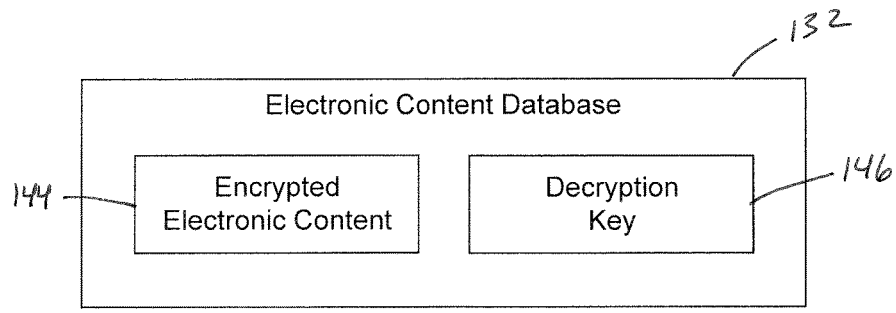
FIG. 5 is a block diagram of an electronic content database of a second electronic device in accordance with embodiments of the present disclosure.

FIG. 5 is a block diagram of the electronic content database 132 of the second electronic device 104. The electronic content database 132 can store therein encrypted electronic content 144 and one or more decryption keys 146. For example, the encrypted electronic content 144 and the associated decryption key 146 can correspond to the encrypted electronic content 132 and the decryption key 130 generated and sent from the first electronic device 102. In some embodiments, the encrypted electronic content 144 and the associated decryption key 146 can correspond to data received from other devices/users and/or encrypted data generated at the second electronic device 104.

It should be understood that the block diagrams of FIGS. 2-5 are provided for illustrative purposes only. In particular, FIGS. 2-5 illustrate a system 100 in which encrypted electronic content 128 is generated at the first electronic device 102 and sent to the second electronic device 104 for decryption. However, in some embodiments, the second electronic device 104 can also be used to generate encrypted electronic content to be sent to the first electronic device 102. As such, in some embodiments, the second electronic device 104 can include (in addition to or in combination with the electronic content database 132 and the engines 134-138) the electronic content database 106 and the engines 108-118 substantially similar to those of the first encryption device 102 to permit the second electronic device 104 to generate and send the encrypted electronic content to the first electronic device 102. Similarly, in some embodiments, the first electronic device 102 can include (in addition to or in combination with the electronic content database 106 and the engines 108-118) the electronic content database 132 and the engines 134-138 substantially similar to those of the second electronic device 104 to permit the first electronic device 102 to receive and decrypt the encrypted electronic content sent from the second electronic device 104.

Figure 6:
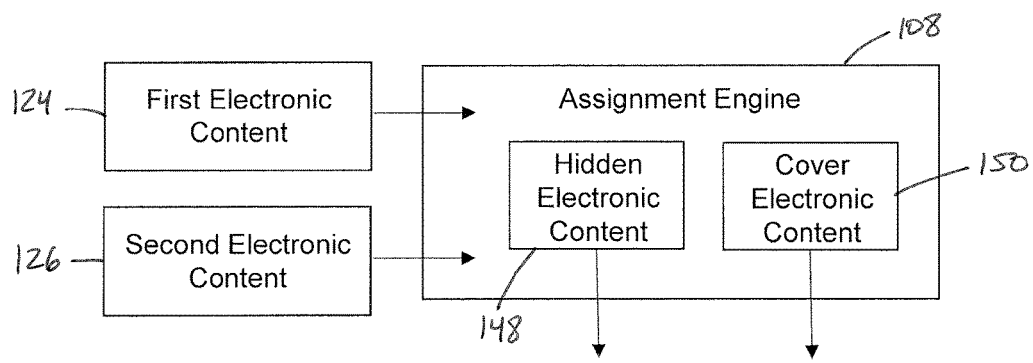
FIG. 6 is a block diagram of an assignment engine of a first electronic device in accordance with embodiments of the present disclosure.

FIG. 6 is a block diagram of the assignment engine 108 of the first electronic device 102. The assignment engine 108 can programmatically execute an assignment function that receives as input the first electronic content 124 and the second electronic content 126 and that outputs a hidden electronic content 148 and a cover electronic content 150. In particular, the user of the first electronic device 102 can use the assignment engine 108 to input, through the GUI 122, the first electronic content 124 to be designated or labeled as the hidden electronic content 148, i.e., the electronic content to be hidden from view when encrypted. The user can further use the assignment engine 108 to input, through the GUI 122, the second electronic content 126 to be designated or labeled as the cover electronic content 150, i.e., the electronic content to overlay the hidden electronic content 148 and be viewable prior to decryption of the encrypted electronic content 128.

Figure 7:
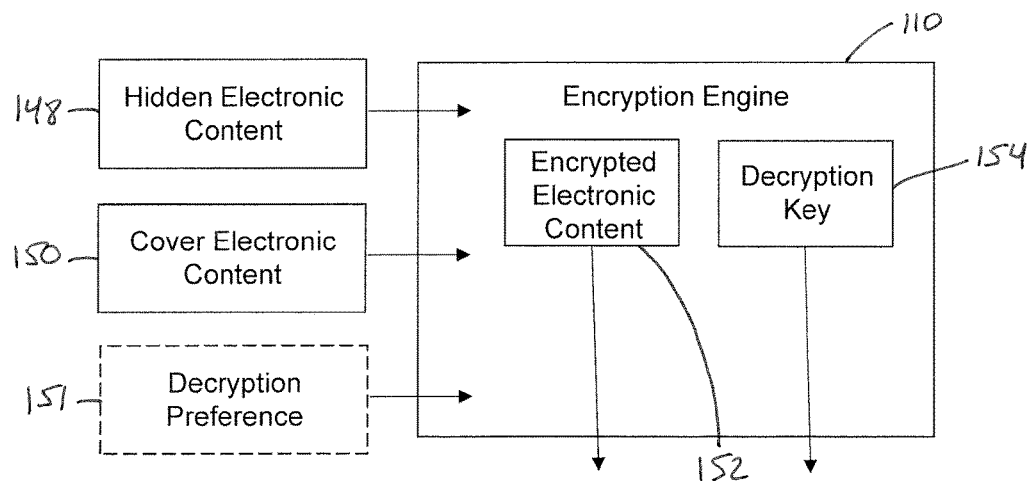
FIG. 7 is a block diagram of an encryption engine of a first electronic device in accordance with embodiments of the present disclosure.

FIG. 7 is a block diagram of the encryption engine 110 of the first electronic device 102. The encryption engine 110 can programmatically execute an encryption function to encrypt the hidden electronic content 148 and the cover electronic content 150 such that, prior to decryption, only the cover electronic content 150 is viewable to the user and third parties. The encryption engine 110 can receive as input the hidden electronic content 148 and the cover electronic content 150, and outputs an encrypted electronic content 152 and a decryption key 154 associated with the encrypted electronic content 152. In some embodiments, the encryption engine 110 can optionally receive as input a decryption preference 151. The decryption preference 151 can be designated by the user and can indicate whether physical input by a user is necessary to execute a decryption function on the first and/or second electronic device 102, 104. The decryption preference 151 can be programmatically incorporated into or linked to the encrypted electronic content 152 by the encryption engine 110. As will be discussed in greater detail below, the decryption preference 151 can act as a security measure to prevent screenshots or snapshots from being taken of the hidden electronic content 148 during decryption.

The encrypted electronic content 152 and the decryption key 154 can be saved in the electronic content database 106 for future access. In some embodiments, the decryption key 154 can be incorporated and/or coded directly into the encrypted electronic content 152 such that two separate files are not necessary for decryption. In some embodiments, the decryption key 154 can be a separate file from the encrypted electronic content 152 and can be programmatically connected or tied to the encrypted electronic content 152 such that the appropriate decryption key 154 is used when decryption occurs.

The decryption key 154 can be uniquely generated by the encryption engine 110 to decrypt the encrypted electronic content 152. Thus, each encrypted electronic content 152 generated by the encryption engine 110 can include a unique decryption key 154. During encryption, the encryption engine 110 can overlay the cover electronic content 150 over the hidden electronic content 148, thereby hiding the hidden electronic content 148 from view at a first location of the GUI 122, 142, e.g., the camera roll of the first and/or second electronic device 102, 104. Thus, if a user or a third party attempts to view the encrypted electronic content 152 on the first and/or second electronic device 102, 104 at the first location, only the cover electronic content 150 will be visible.

As an example, a user can select a first photograph that the user would like to hide from regular view and can further select a second photograph as a photograph that will be viewable prior to decryption. The first photograph can thereby act as the hidden electronic content 148 and the second photograph can act as the cover electronic content 150. As noted above, the encryption engine 110 can encrypt the first and second photographs such that the cover electronic content 150 overlays the hidden electronic content 148 and, prior to decryption, only the cover electronic content 150 is viewable. Thus, if the user encrypts the first and second photographs and the resulting encrypted photograph is saved on the camera roll of the first electronic device 102, only the second photograph (i.e., the cover electronic content 150) will be viewable prior to decryption and the first photograph (i.e., the hidden electronic content 148) will not be viewable at the first location. A similar decryption can occur if the encrypted electronic content 152 is sent to the second electronic device 104.

Figure 8:
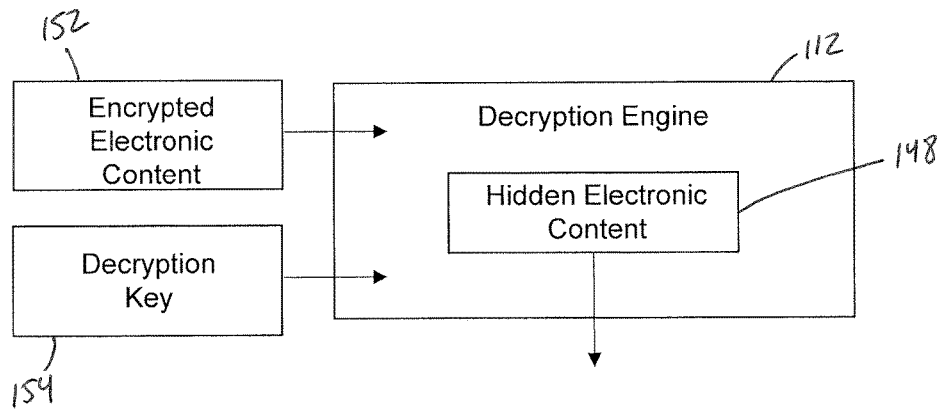
FIG. 8 is a block diagram of a decryption engine of a first electronic device in accordance with embodiments of the present disclosure.

FIG. 8 is a block diagram of the decryption engine 112 of the first electronic device 102. The decryption engine 112 can be used to decrypt the encrypted electronic content 152 is saved to, e.g., the camera roll or another storage medium, on the first electronic device 102 for future viewing. The decryption engine 112 can programmatically execute a decryption function that receives as input the encrypted electronic content 152 and the associated decryption key 154 generated by the encryption engine 110, and that outputs the hidden electronic content 148 at a second location of the first electronic device 102, e.g., an application associated with the system 100.

In some embodiments, the encryption engine 110 can be used to receive as input from the user a preference for how decryption can be activated by the user and/or users who receive the encrypted electronic content 152. The preference for decryption can be input by the user prior to executing the encryption function such that the preferences can be programmatically tied to the encrypted electronic content 152. The preferences can include, for example, automatic decryption, physical input at a single point on the GUI, physical input at multiple points on the GUI, or the like.

In some embodiments, opening the encrypted electronic content 152 in an application on the first and/or second electronic device 102, 104 can automatically execute the decryption function to expose the hidden electronic content 148. In some embodiments, the encrypted electronic content 152 can be opened in the application associated with the system 100 on the first and/or second electronic device 102, 104 and physical input is required from the user via the GUI 122, 152 to execute the decryption function and expose the hidden electronic content 148.

In some embodiments, the physical input can be a touch and hold at a single point on the GUI 122, 152. In some embodiments, the user can touch and hold at a single point on the GUI 122, 152 and the hidden electronic content 148 can be exposed until the user removes the physical input. For example, the user can touch and hold at a single point on the GUI 122, 152 with one finger or an input device, such as a mouse, to view the hidden electronic content 148. Lifting the finger or releasing the mouse button can stop execution of the decryption function, thereby hiding the hidden electronic content 148 behind the cover electronic content 150 until further decryption is performed.

In some embodiments, the physical input can be a touch and hold at multiple different points on the GUI 122, 152. For example, the physical input can be a touch and hold at four or more different points on the GUI 122, 152. This can be accomplished on a touchscreen by using four or more different fingers to press on the GUI 122, 152. The physical input of multiple different points can act as a safety feature to physically prevent the user from generating a screenshot of the GUI 122, 152 on the first and/or second electronic device 102, 104. For example, on the iPhone®, a screenshot can be taken of the GUI by holding the "Home" button and simultaneously clicking the "Sleep/Wake" button, thereby saving a photo of the GUI in the camera roll. Screenshots of the GUI 122, 152 can be problematic if a user on the second electronic device 104 desires to capture a screenshot of the hidden electronic content 148 after decryption. The physical input at multiple different points on the GUI 122, 152 can physically limit or prevent the user from providing the necessary physical input while simultaneously depressing the necessary buttons on the electronic device to capture the screenshot. The physical input requirement thereby acts as a security measure to limit or prevent screenshots during decryption.

In some embodiments, with respect to encrypted electronic content 152 created on the first electronic device 102, decryption can be performed on the first electronic device 102 without time and/or viewing limits. In some embodiments, with respect to encrypted electronic content 152 created on the first electronic device 102, the user can designate one or more limitations on decryption. For example, one or more limitations can be created to limit the rights of third parties who receive the encrypted electronic content 152 from the first electronic device 102, thereby preventing widespread distribution and/or unlimited viewing of the hidden electronic content 148. In some embodiments, one or more limitations created to limit the rights of third parties who receive the encrypted electronic content 152 can be adjusted and/or applied by the user of the first electronic device 102 at a point in time after electronically transmitting the encrypted electronic content 152 to the second electronic device 104.

In some embodiments, the distribution rights engine 116 of FIG. 2 can be programmatically executed to run a distribution rights function to assign one or more distribution rights to the encrypted electronic content 152. In some embodiments, the distribution rights function can be executed prior to or during encryption such that the encrypted electronic content 152 programmatically includes the distribution rights associated therewith. In some embodiments, the distribution rights engine 116 can be incorporated into the encryption engine 110 such that, during encryption, the distribution rights are programmatically incorporated into or linked directly to the encrypted electronic content 152.

In some embodiments, the distribution rights can completely prevent the encrypted electronic content 152 from being distributed by the user receiving the encrypted electronic content 152 on the second electronic device 104. In some embodiments, the distribution rights can limit the number of times the encrypted electronic content 152 can be distributed by the user receiving the encrypted electronic content 152 on the second electronic device 104. For example, the distribution rights can limit the user to one, two, three, or the like, times the encrypted electronic content 152 can be distributed to other users and/or other electronic devices from the second electronic device 104. In some embodiments, when the user distributes the encrypted electronic content 152 from the second electronic device 104, the distribution rights can prevent other users from further distributing the encrypted electronic content 152.

In some embodiments, the distribution rights can limit the total number of times the encrypted electronic content 152 can be distributed. For example, the distribution rights can limit the total number of times the encrypted electronic content 152 can be distributed to one, two, three, or the like, limiting each user to a single distribution. Thus, if the total number of distributions allowed is set to two, the user receiving the encrypted electronic content 152 on the second electronic device 104 can distribute the encrypted electronic content 152 to a third user (i.e., a first distribution), and the third user can distribute the encrypted electronic content 152 to a fourth user (i.e., a second distribution). However, the distribution rights can prevent the fourth user from further distribution the encrypted electronic content 152.

Figure 9:
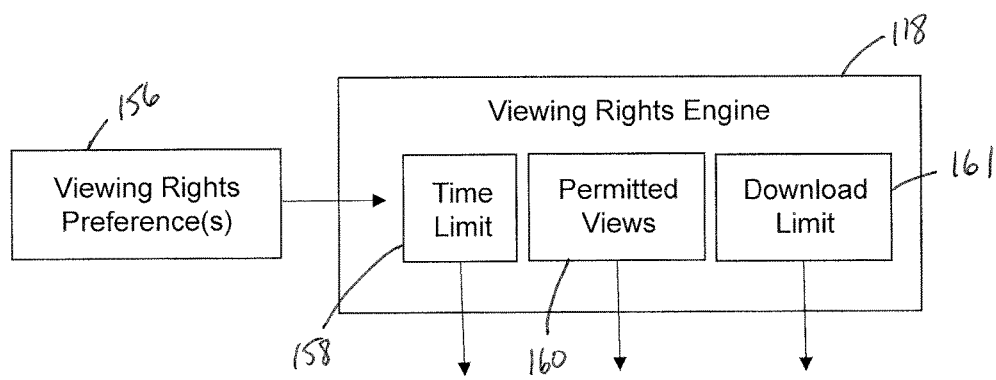
FIG. 9 is a block diagram of a viewing rights engine of a first electronic device in accordance with embodiments of the present disclosure.

In some embodiments, in addition to or in combination with the distribution rights, one or more viewing rights can be assigned to the encrypted electronic content 152 by programmatically executing a viewing rights function with the viewing rights engine 118. FIG. 9 is a block diagram of the operation of the viewing rights engine 118. The viewing rights engine 118 can receive as input one or more viewing rights preferences 156 and outputs, e.g., a time limit 158 for viewing the hidden electronic content 148, a number of permitted views 160 of the hidden electronic content 148, a download limit 161 indicating whether the recipient can download the encrypted electronic content 152 to the electronic device of the recipient, combinations thereof, or the like. In some embodiments, the viewing rights can be assigned to the encrypted electronic content 152 after encryption has occurred at the encryption engine 110. In some embodiments, the viewing rights engine 118 can be incorporated into the encryption engine 110 such that the viewing rights are designated prior to encryption and, during encryption, the viewing rights are programmatically incorporated into or linked directly to the encrypted electronic content 152. In some embodiments, the viewing rights preferences 156 can apply only to the user receiving the encrypted electronic content 152 on the second electronic device 104, and do not apply to the user who generated the encrypted electronic content 152 on the first electronic device 102. Thus, the encrypted electronic content 152 can be decrypted without limitations on the electronic device on which the encrypted electronic content 152 was created. In some embodiments, the viewing rights preferences 156 can be adjusted and/or applied to the encrypted electronic content 152 after the encrypted electronic content 152 has been electronically transmitted from the first electronic device 102 to the second electronic device 104.

For example, the time limit 158 can limit the time period in which the hidden electronic content 148 can be viewed, i.e., the time period in which the encrypted electronic content 152 can be decrypted. In some embodiments, the time limit 158 can be, e.g., seconds, minutes, hours, days, weeks, months, years, or the like. For example, the user generating the encrypted electronic content 152 on the first electronic device 102 can designate a viewing rights preference 156 to include a time limit 158 of five minutes. The encrypted electronic content 152 can be transmitted to the second electronic device 104 via the transmission engine 114. The time limit 158 can apply and begin to run after the user has decrypted the encrypted electronic content 152 on the second electronic device 104 for the first time. Thus, from the first point of decryption of the encrypted electronic content 148 on the second electronic device 104, the time period designated in the time limit 158 can begin to count down. A similar limit can apply if the distribution rights allow for further distribution of the encrypted electronic content 152. In some embodiments, the time limit 158 and/or the distribution rights can be adjusted and/or applied by the user of the first electronic device 102 after the encrypted electronic content 152 has been electronically transmitted to the second electronic device 104.

As a further example, the permitted views 160 can limit the number of permitted times the hidden electronic content 148 can be viewed, i.e., the number of permitted times the encrypted electronic content 152 can be decrypted. The permitted views 160 can be directly input by the user generating the encrypted electronic content 152 and can be, e.g., one view, two views, three views, four views, five views, or the like. For example, the user generating the encrypted electronic content 152 on the first electronic device 102 can designate a viewing rights preference 156 to include a permitted views 160 of three views. The encrypted electronic content 152 can be transmitted to the second electronic device 104 via the transmission engine 114. The permitted views 160 can apply from the first decryption of the encrypted electronic content 152 on the second electronic device 104 and can count down until the number of permitted views 160 has been reached. A similar limit can apply if the distribution rights allow for further distribution of the encrypted electronic content 152. In some embodiments, the permitted views 160 can be adjusted and/or applied by the user of the first electronic device 102 after the encrypted electronic content 152 has been electronically transmitted to the second electronic device 104.

As a further example, the download limit 161 can limit the ability of the recipient of the encrypted electronic content 152 to download the encrypted electronic content 152 to a storage database of the second electronic device 104. The download limit 161 can be directly input by the user generating the encrypted electronic content 152 and can be a right to download or no right to download the encrypted electronic content 152. The encrypted electronic content 152 can be transmitted to the second electronic device 104 via the transmission engine 114. The download limit 161 can apply upon receipt of the encrypted electronic content 152 at the second electronic device 104. For example, if the download limit 161 does not allow the user to download the encrypted electronic content 152 to the second electronic device 104, the option to download the encrypted electronic content 152 will not appear or will be grayed out in the user interface. As a further example, if the download limit 161 does allow the user to download the encrypted electronic content 152 to the second electronic device 104, the option to download the encrypted electronic content 152 can appear as a button in the user interface. The user can thereby actuate the button to save the encrypted electronic content 152 in, e.g., the camera roll, or the like, of the second electronic device 104. The encrypted electronic content 152 can appear as the cover electronic content 150 in the saved location prior to decryption. In some embodiments, the download limit 161 can be adjusted and/or applied by the user of the first electronic device 102 after the encrypted electronic content 152 has been electronically transmitted to the second electronic device 104.

The second electronic device 104 can include a self-destruct engine 138 that can be programmatically executed to alter, remove or destroy the decryption key 154 associated with the encrypted electronic content 152 upon reaching the limit of the viewing rights preferences 156. For example, if the time limit 158 for viewing and/or the number of permitted views 160 of the hidden electronic content 148 has been reached, the self-destruct engine 138 can be executed to alter, remove or destroy the decryption key 154 such that the encrypted electronic content 152 can no longer be decrypted, leaving only the cover electronic content 150 as viewable to users. In some embodiments, the self-destruct engine 138 can automatically delete or erase all data associated with the encrypted electronic content 152 (e.g., the hidden electronic content 148, the cover electronic content 150, and the decryption key 154) from the second electronic device 104, thereby preventing viewing of any data associated with the encrypted electronic content 152. In some embodiments, the self-destruct engine 138 can be used remotely by the user of the first electronic device 102 to alter, remove or destroy one or more portions of the encrypted electronic content 152 transmitted to the second electronic device 104 at a point in time after the encrypted electronic content 152 has been transmitted to the second electronic device 104.

In some embodiments, the viewing rights preference 156 can include both the time limit 158 and the permitted views 160. In such embodiments, the self-destruct engine 138 can be executed to alter, remove or destroy the decryption key 154 upon reaching a limit of one of the viewing rights preference 156. For example, the time limit 158 can be designated as thirty minutes and the permitted views 160 can be designated as five views. If the user has decrypted the encrypted electronic content 152 five times to view the hidden electronic content 148 before the thirty minute limitation has been reached, the self-destruct engine 138 can be executed after the fifth decryption. Thus, an attempt to decrypt the encrypted electronic content 152 a sixth time before the thirty minute limitation has been reached will result in viewing only the cover electronic content 150 and the hidden electronic content 148 can be permanently hidden from view.

As noted above, the transmission engine 114 of the first electronic device 102 can be programmatically executed to transmit the encrypted electronic content 152 and the decryption key 154 to the second electronic device 104 via, e.g., a communications network. The second electronic device 104 also includes the transmission engine 136 that can be configured to receive the encrypted electronic content 152 and the decryption key 154. In some embodiments, the encrypted electronic content 152 and the decryption key 154 can be saved in the electronic content database 132 of the second electronic device 104. For example, the encrypted electronic content 152 can be saved in the camera roll of the second electronic device 104. Prior to decryption, only the cover electronic content 150 can be viewable on the second electronic device 104.

The encrypted electronic content 152 can programmatically include therein the decryption preference 151, one or more distribution rights, and/or one or more viewing rights designated by the user generating the encrypted electronic content 152 on the first electronic device 102. Upon receipt of the encrypted electronic content 152 at the second electronic device 104, the user can be notified via the GUI 142 of the preferences or limitations associated with the encrypted electronic content 152. For example, the user can be notified of the requirement for physical input at multiple points on the GUI 142 to decrypt the encrypted electronic content 152, the time limits for viewing the hidden electronic content 148, the number of permitted views of the hidden electronic content 148, combinations thereof, or the like.

Figure 10:
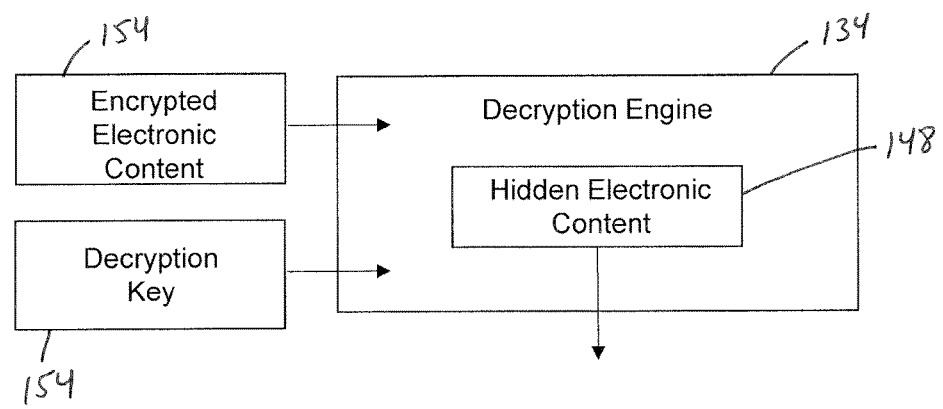
FIG. 10 is a block diagram of a decryption engine of a second electronic device in accordance with embodiments of the present disclosure.

FIG. 10 is a block diagram of the decryption engine 134 of the second electronic device 104. The decryption engine 134 can function substantially similarly to the decryption engine 112 of the first electronic device 102. In particular, the decryption engine 134 can be programmatically executed to receive as input the encrypted electronic content 152 and the associated decryption key 154 received from the first electronic device 102, and outputs the hidden electronic content 148. The decryption engine 134 can take into account the decryption preference 151, one or more distribution rights, and/or one or more viewing rights associated with the encrypted electronic content 152 when decrypting the encrypted electronic content 152. For example, the decryption engine 134 can keep count of the time limit and/or the number of views associated with the hidden electronic content 148.

Figure 11:
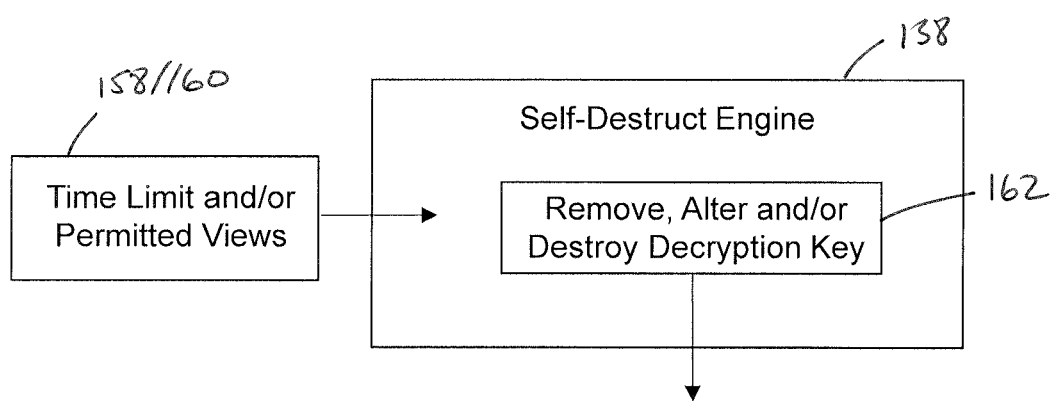
FIG. 11 is a block diagram of a self-destruct engine of a second electronic device in accordance with embodiments of the present disclosure.

FIG. 11 is a block diagram of the self-destruct engine 138 of the second electronic device 104. The self-destruct engine 138 can programmatically execute a self-destruct function to alter, remove and/or destroy 162 the decryption key 154 associated with the encrypted electronic content 152, thereby preventing subsequent decryption of the encrypted electronic content 152 and permanently hiding the hidden electronic content 148, leaving only the cover electronic content 150 as viewable on the second electronic device 104.

The self-destruct engine 138 can receive as input the time limit 158 and/or the permitted views 160 limitation associated with the encrypted electronic content 152. The self-destruct engine 138 and/or the decryption engine 134 can keep track of a counter related to the time limit 158 and/or permitted views 160 to ensure that neither limit has been reached. Upon reaching one of the limits, the self-destruct engine 138 can be executed to alter, remove and/or destroy 162 the decryption key 154, preventing subsequent decryption of the encrypted electronic content 152. Although the user may be able to distribute the encrypted electronic content 152 to other users and/or other electronic devices, the encrypted electronic content 152 is distributed with the altered, removed and/or destroyed 162 decryption key 154, thereby preventing other users from decrypting the encrypted electronic content 152. The hidden electronic content 148 can therefore be permanently hidden from view, providing a safety or privacy feature for the user originating the encrypted electronic content 152.

Figure 12:
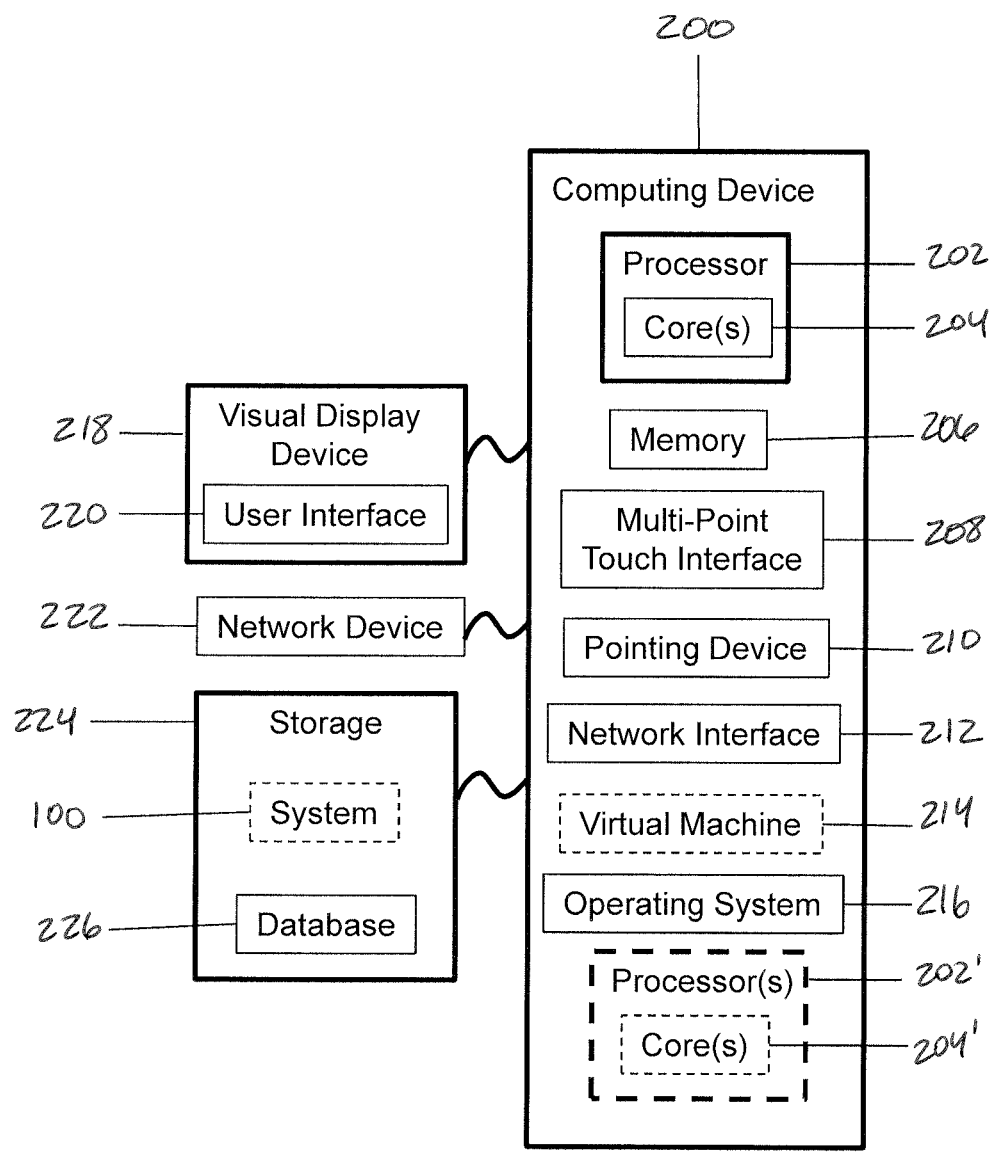
FIG. 12 is a block diagram of a computing device configured to implement embodiments of an electronic content transformation system in accordance with embodiments of the present disclosure.

FIG. 12 is a block diagram of a computing device 200 configured to implement embodiments of the system 100 in accordance with embodiments of the present disclosure. In some embodiments, the computing device 200 can represent the first and/or second electronic device 102, 104. The computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in the computing device 200 may store computer-readable and computer-executable instructions or software for implementing exemplary embodiments of the present disclosure (e.g., the one or more engines 108-118 of the first electronic device 102, one or more engines 134-138 of the second electronic device 104, combinations thereof, or the like). The computing device 200 also includes configurable and/or programmable processor 202 and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in the computing device 200 so that infrastructure and resources in the computing device may be shared dynamically. A virtual machine 214 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

A user may interact with the computing device 200 through a visual display device 218, such as a computer monitor or a smart phone screen, which may display one or more user interfaces 220 that may be provided in accordance with exemplary embodiments (e.g., the user interface 120 with the GUI 122, the user interface 140 with the GUI 142, or the like). The computing device 200 may include other I/O devices for receiving input from a user, for example, a keyboard or any suitable multi-point touch interface 208 (e.g., a touch screen), a pointing device 210 (e.g., a mouse), or the like. The keyboard 208 and the pointing device 210 may be coupled to the visual display device 218. The computing device 200 may include other suitable conventional I/O peripherals.

The computing device 200 may also include one or more storage devices 224, such as a hard-drive, CD-ROM, or other computer readable media, for storing data and computer-readable instructions and/or software that implement exemplary embodiments of the system 100 described herein. Exemplary storage device 224 may also store one or more databases 226 for storing any suitable information required to implement exemplary embodiments. For example, exemplary storage device 224 can store one or more databases 226 for storing information, such as data stored within the electronic content database 106 and/or the electronic content database 132, and computer-readable instructions and/or software that implement exemplary embodiments described herein. The databases 226 may be updated by manually or automatically at any suitable time to add, delete, and/or update one or more items in the databases 226.

The computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing the computing device 200 to any type of network capable of communication and performing the operations described herein. Moreover, the computing device 200 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 200 may run any operating system 216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 216 may be run in native mode or emulated mode. In an exemplary embodiment, the operating system 216 may be run on one or more cloud machine instances.

Figure 13:
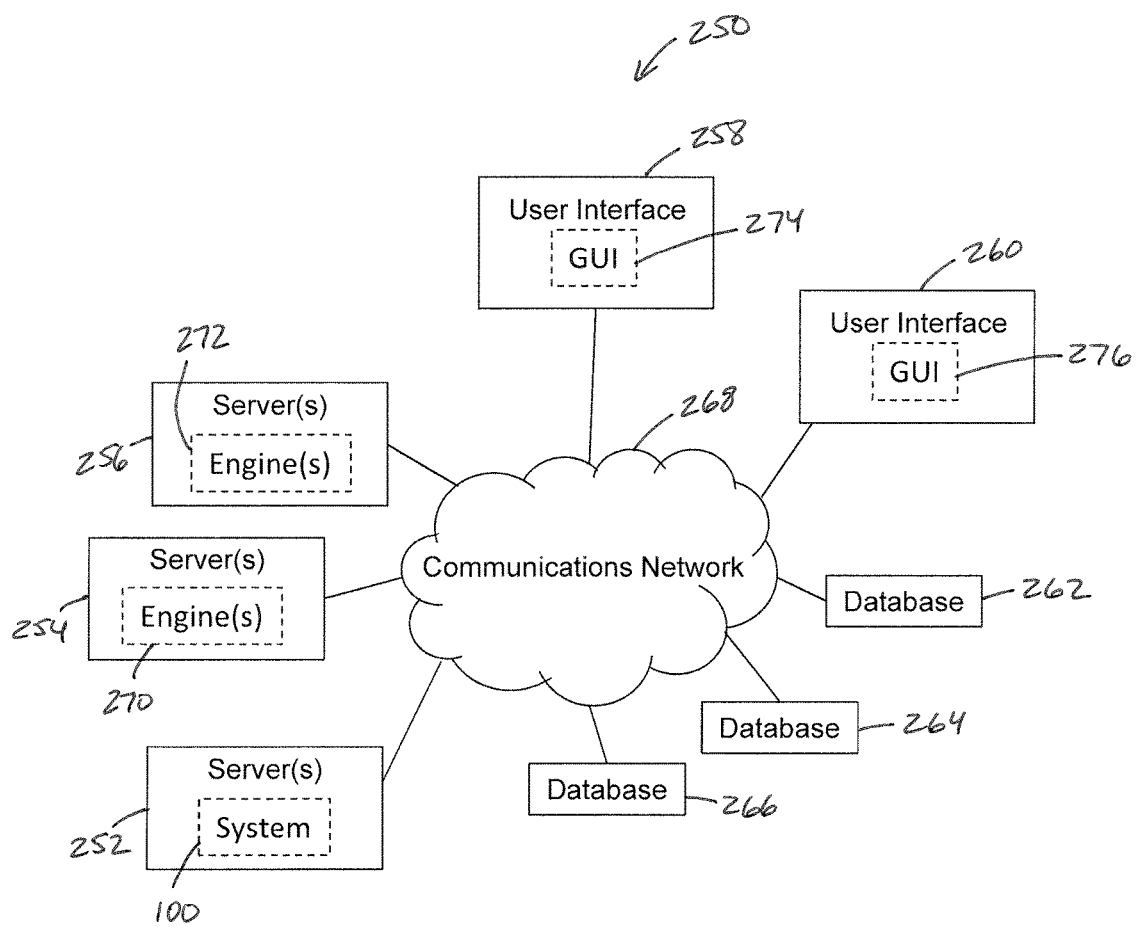
FIG. 13 is a block diagram of a distributed environment for implementing embodiments of an electronic content transformation system in accordance with embodiments of the present disclosure.

FIG. 13 is a block diagram of a distributed environment 250 for implementing embodiments of the system 100 in accordance with embodiments of the present disclosure. The environment 250 can include one or more servers 252-256 operatively coupled to one or more user interfaces 258, 260, and databases 262-266, via a communication network 268, which can be any network over which information can be transmitted between devices communicatively coupled to the network. For example, the communication network 268 can be the Internet, Intranet, virtual private network (VPN), wide area network (WAN), local area network (LAN), wireless network, wired network, and the like. The environment 250 can include repositories or database devices 262-266, which can be operatively coupled to the server(s) 252-256, as well as to user interfaces 258, 260, via the communications network 268. In exemplary embodiments, the server(s) 252-256, user interfaces 258, 260, and database devices 262-266 can be implemented as computing devices (e.g., computing device 200). Those skilled in the art will recognize that the database devices 262-266 can be incorporated into one or more of the servers 252-256 such that one or more of the servers 252-256 can include the databases 262-266.

In some embodiments, the database 262 can store information relating to one or more parts of the electronic content database 106. In some embodiments, the database 264 can store information relating to one or more parts of the electronic content database 132. In some embodiments, one or more parts of the electronic content database 106, 132 can be distributed over the databases 262-266.

In some embodiments, the servers 252-256 can be configured to implement one or more components of the system 100. In some embodiments, the server 252 can be configured to implement one or more components of the system 100. In some embodiments, the server 254 can be configured to implement one or more engines 270 of the first electronic device 102. In some embodiments, the server 256 can be configured to implement one or more engines 272 of the second electronic device 104. In some embodiments, the user interfaces 258, 260 (e.g., user interface 120, user interface 140, or the like) include a graphical user interface 274, 276 (e.g., GUI 122, GUI 142, or the like) for presenting information to the user.

Figure 14:
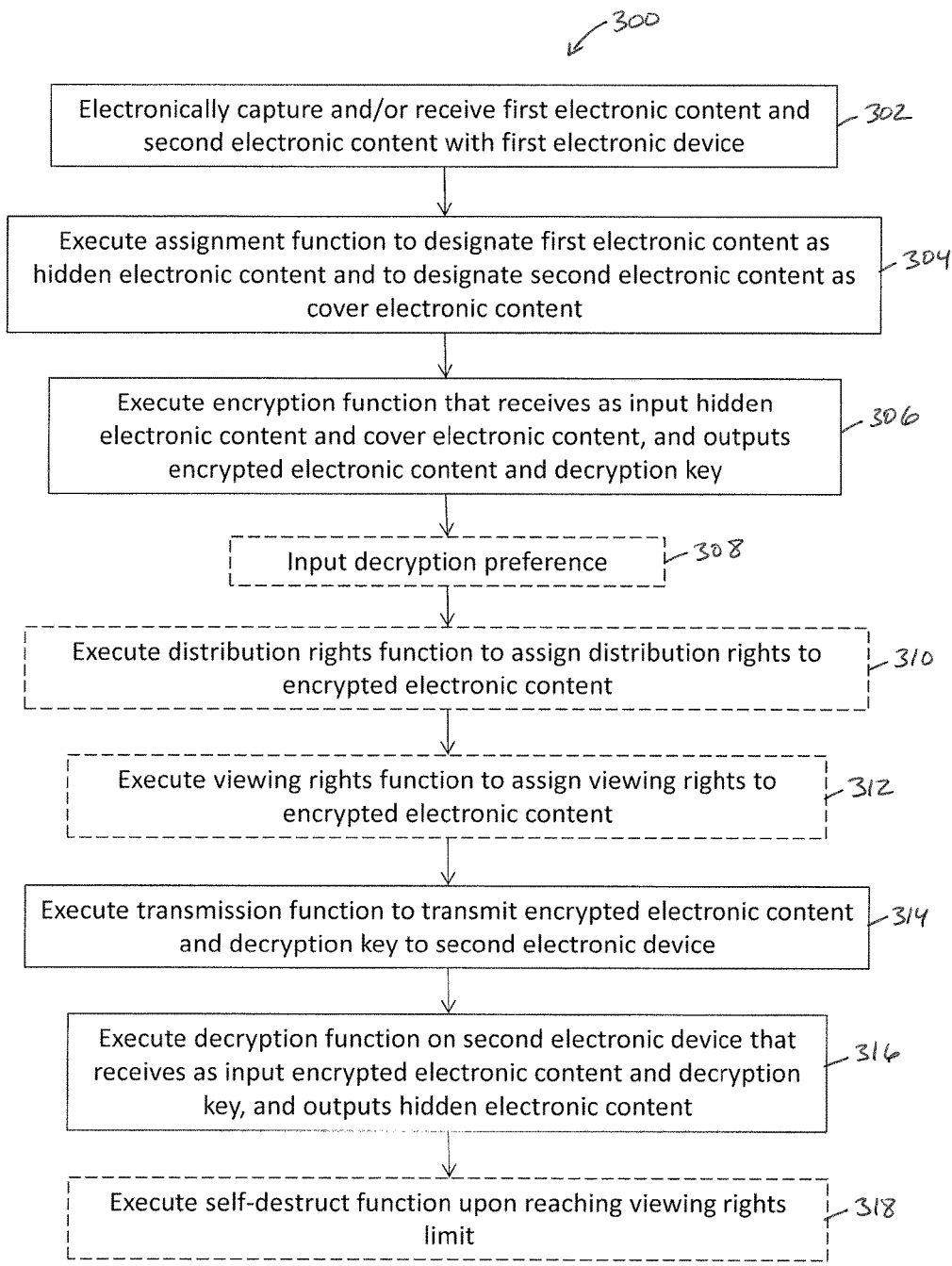
FIG. 14 is a flowchart illustrating implementation of an electronic content transformation system in accordance with embodiments of the present disclosure.

FIG. 14 is a flowchart illustrating an exemplary process 300 of the system 100 in accordance with embodiments of the present disclosure. To begin, at step 302, first electronic content and second electronic content can be electronically captured and/or received at the first electronic device. At step 304, an assignment function can be executed with an assignment engine to designate the first electronic content as the hidden electronic content and to designate the second electronic content as the cover electronic content. At step 306, an encryption function can be executed with an encryption engine to receive as input the hidden electronic content and the cover electronic content, and output the encrypted electronic content and the decryption key associated with the encrypted electronic content.

In some embodiments, at step 308, a decryption preference can optionally be input and associated with the encrypted electronic content. As noted above, the decryption preference can require a physical input from a user for executing the decryption function. In some embodiments, at step 310, a distribution rights function can optionally be executed with a distribution rights engine to assign one or more distribution rights to the encrypted electronic content. As noted above, the distribution rights can prevent or limit further distribution of the received encrypted electronic content from the second electronic device. In some embodiments, at step 312, a viewing rights function can optionally be executed with a viewing rights function to assign one or more viewing rights to the encrypted electronic content. As noted above, the viewing rights can set limits regarding viewing time and/or number of permitting views of the hidden electronic content. Although shown as occurring after the encryption step 306, in some embodiments, steps 308-312 can occur prior to the encryption step 306 and the input decryption preference, distribution rights, viewing rights, or combinations thereof, can be incorporated directly into the encrypted electronic content during the encryption step 306.

At step 314, a transmission function can be executed with a transmission engine to transmit the encrypted electronic content and the decryption key (and any associated preferences or limits/rights) to the second electronic device. At step 316, a decryption function can be executed with a decryption engine on the second electronic device that receives as input the encrypted electronic content and the decryption key, and that outputs the hidden electronic content. The hidden electronic content can be viewed only during the decryption process (e.g., while the user provides the physical input to the GUI) and, upon stopping the decryption process (e.g., when the user removes the necessary physical input to the GUI), the hidden electronic content can again be overlaid with the cover electronic content. In some embodiments, at step 318, a self-destruct function can optionally be executed with a self-destruct engine upon reaching one of the viewing rights limits to destroy, alter and/or remove the decryption key, thereby preventing further decryption of the encrypted electronic content.

Figure 15:
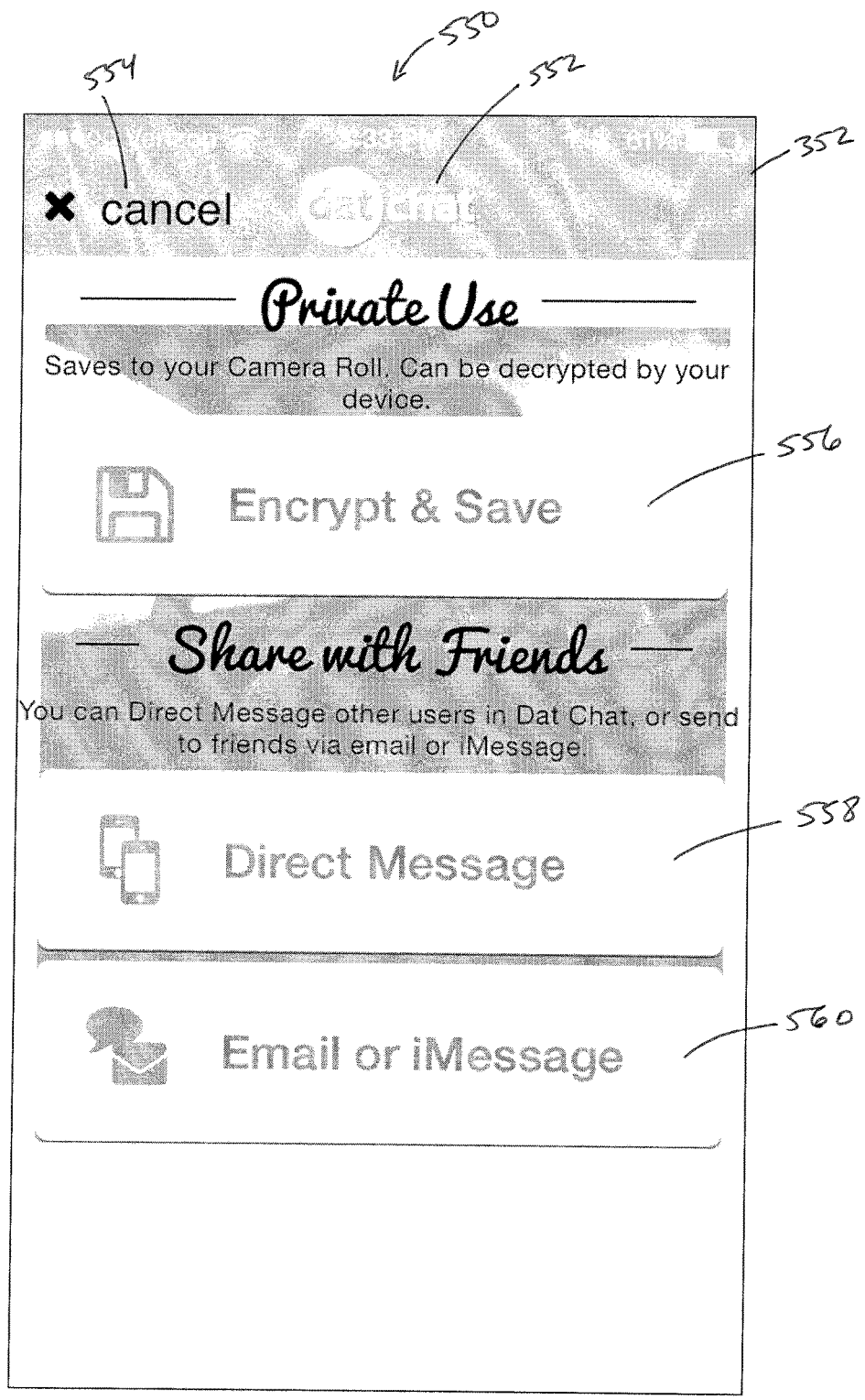
FIG. 15 is a graphical user interface window of an electronic content transformation system in accordance with embodiments of the present disclosure, which shows an introduction interface.

FIG. 15 shows an exemplary graphical user interface window 550 of the system 100 in accordance with embodiments of the present disclosure. In particular, the window 550 shows an introduction or home interface on the first electronic device 102 for the system 100. The introduction interface provides selections for various actions that can be taken through the system 100. The first electronic device 102 is represented by the structure 352. The window 550 can include a title 552, e.g., DATCHAT™. The window 550 can include a cancel button 554. Selecting the cancel button 554 can return the user to a home screen of the first electronic device 102.

The window 550 can include a local save button 556, a direct message button 558, and an e-mail/message button 560. Selecting and actuating the local save button 556 can lead to an interface for selecting the first and second electronic content 124, 126, encrypting the first and second electronic content 124, 126 to generate the encrypted electronic content 152, and saving the encrypted electronic content 152 locally on the first electronic device 102. For example, the local save button 556 allows the user to save the encrypted electronic content 152 in a camera roll on the first electronic device 102 such that, prior to decryption, the encrypted electronic content 152 appears only as the cover electronic content 150 in the camera roll.

Selecting and actuating the direct message button 558 can lead to an interface for selecting the first and second electronic content 124, 126, encrypting the first and second electronic content 124, 126 to generate the encrypted electronic content 152, and sending the encrypted electronic content 152 to the second electronic device 104 via a messaging interface within the application (e.g., system 100).

Selecting and actuating the e-mail/message button 560 can lead to an interface for selecting the first and second electronic content 124, 126, encrypting the first and second electronic content 124, 126 to generate the encrypted electronic content 152, and sending the encrypted electronic content 152 to the second electronic device 104 via a messaging interface external to the application (e.g., an e-mail interface, iMessage, or the like). Thus, different options are provided for saving and/or transmitting the encrypted electronic content 152.

Figure 16:
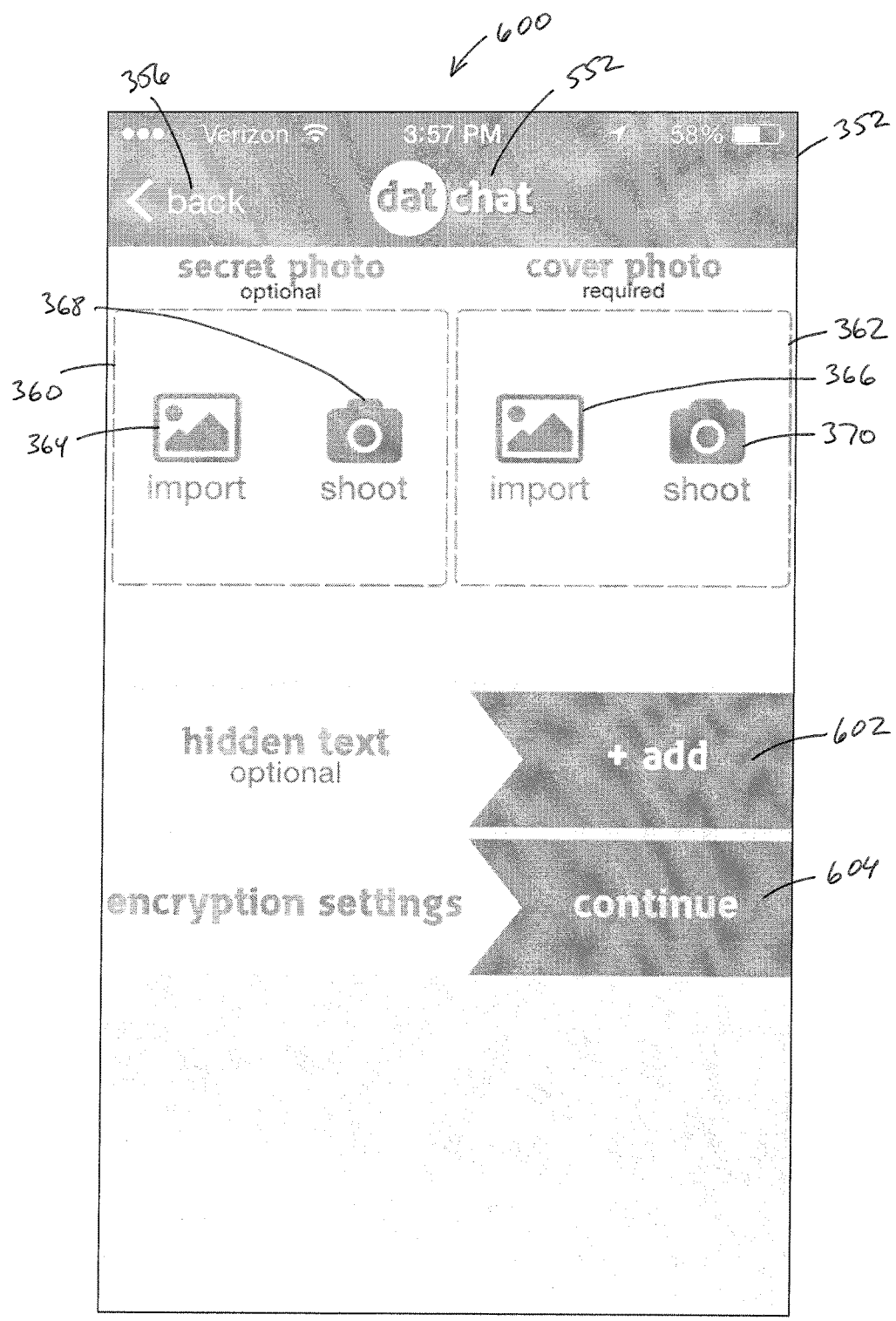
FIG. 16 is a graphical user interface window of an electronic content transformation system in accordance with embodiments of the present disclosure, which shows an assignment and encryption interface.

FIG. 16 shows an exemplary graphical user interface window 600 of the system 100 in accordance with embodiments of the present disclosure. In particular, the window 600 shows an assignment and encryption interface on the first electronic device 102 for assigning the first and second electronic content 124, 126 as the hidden and cover electronic content 148, 150, respectively, via the assignment engine 108. The first electronic device 102 is represented by the structure 352. The window 600 can include a title 552 and a back button 356. The back button 356 can be actuated to return to the introduction screen at window 550. The window 600 can include a first selection section 360 and a second selection section 362 for selecting or capturing the first and second electronic content 124, 126, respectively. The functionality of the first and second selection sections 360, 362 will be discussed in greater detail below with respect to FIGS. 19-21.

The window 600 can include a text button 602 and an encryption settings button 604. Selection and actuation of the text button 602 can present a window and an input interface (e.g., a text section 372 with an electronic input interface 374 of FIG. 19) that can be used to input an alphanumeric text message to be sent with the encrypted electronic content 152. The user can therefore optionally include a message with the encrypted electronic content 152. In some embodiments, the message can be encrypted with the encrypted electronic content 152 such that, prior to decryption, the message is hidden from view.

Selection and actuation of the encryption settings button 604 can present an interface on the first electronic device 102 for inputting and varying the settings for the encryption process, such as viewing rights, distribution rights, decryption options, combinations thereof, or the like. Thus, a user can customize the encryption settings for each encrypted electronic content 152 being saved and/or sent from the first electronic device 102.

Figure 17:
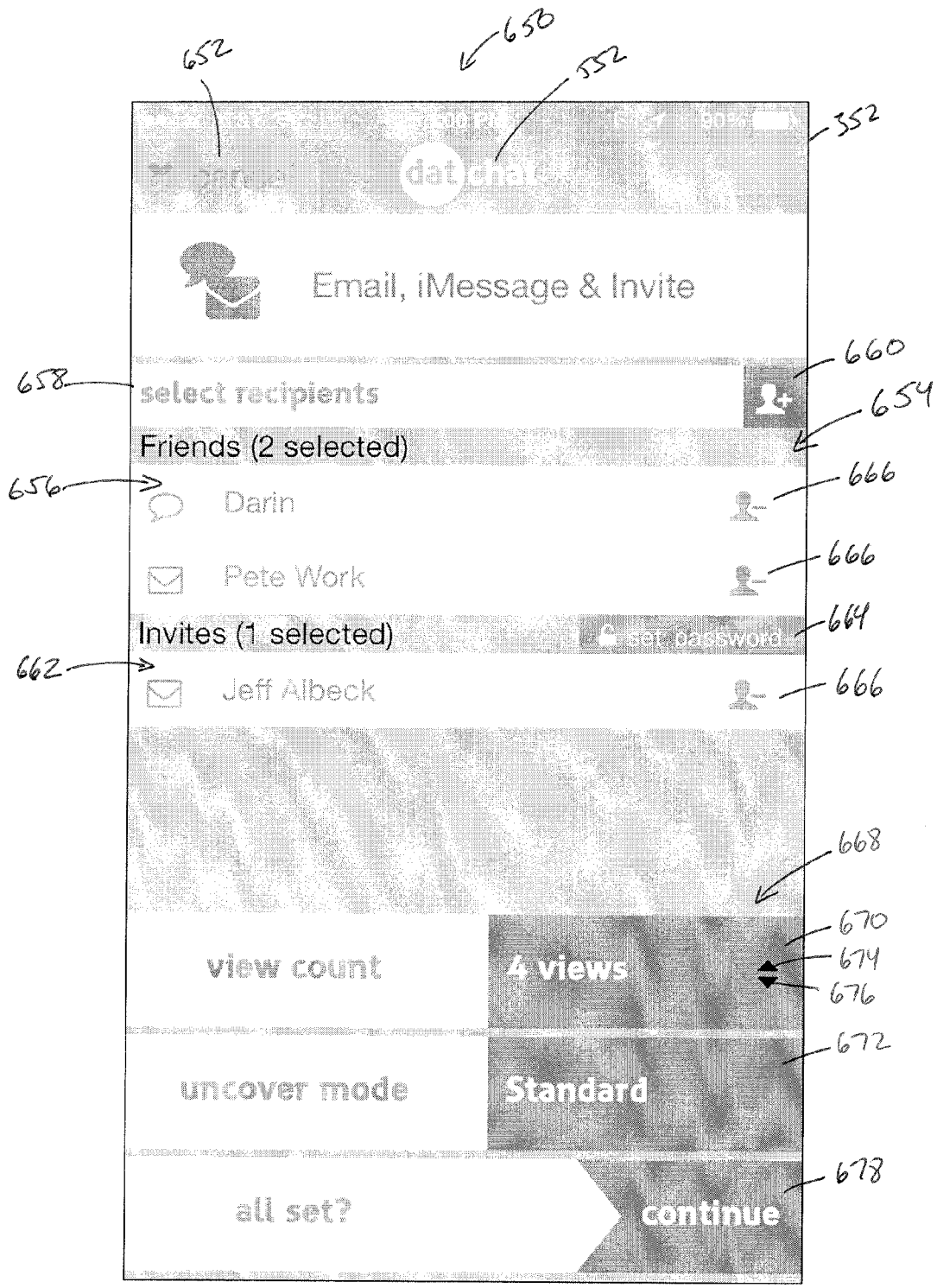
FIG. 17 is a graphical user interface window of an electronic content transformation system in accordance with embodiments of the present disclosure, which shows a settings interface.
Figure 18:
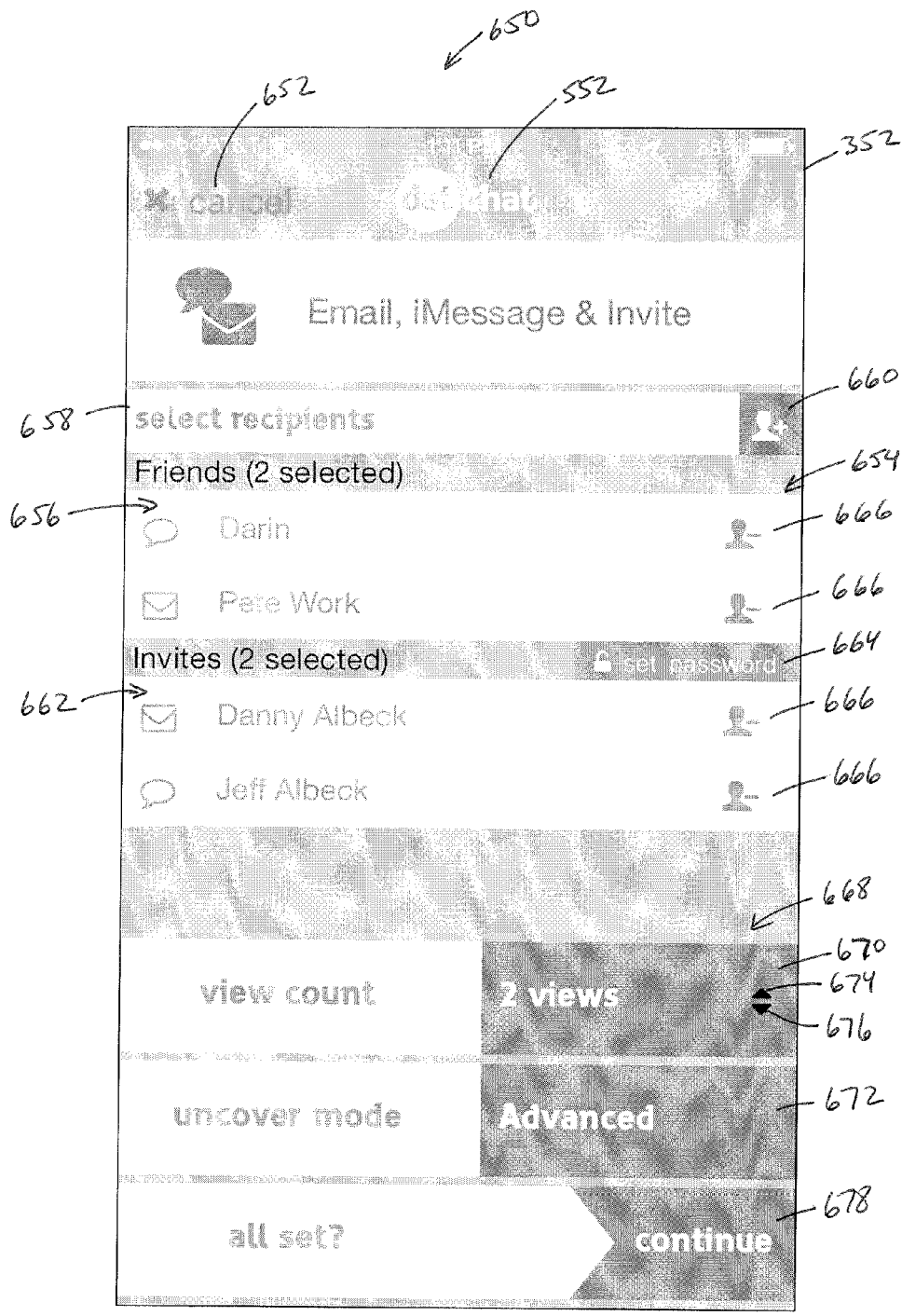
FIG. 18 is a graphical user interface window of an electronic content transformation system in accordance with embodiments of the present disclosure, which shows a settings interface.

FIGS. 17 and 18 show an exemplary graphical user interface window 650 of the system 100 in accordance with embodiments of the present disclosure. In particular, the window 650 shows an encryption settings interface on the first electronic device 102 for indicating settings for encrypting the first and second electronic content 124, 126 via the encryption engine 110. The window 650 can be accessed by selecting the encryption settings button 604 at the window 600 (see FIG. 16).

The window 650 can include the title 552 and a cancel button 652. Actuating the cancel button 652 returns the user to the introduction interface of the window 600. The window 650 can include a recipient section 654 in which recipients for the encrypted electronic content 152 can be selected and/or where additional electronic devices can be invited to join the system 100. For example, the recipient section 654 can include a friends section 656 that includes contacts that are part of the system 100 and can receive the encrypted electronic content 152 of their respective electronic devices. In some embodiments, the recipient section 654 can include a search window 658 in which alphanumeric text can be input to search the list of contacts in the friends section 656, thereby narrowing the list to the desired contacts. In some embodiments, the search window 658 can be used to search contacts on the first electronic device 102 and button 660 can be used to add the desired contact to the friends section 656, thereby allowing the user to send the encrypted electronic content 152 to the contact.

The recipient section 654 can include an invites section 662. The invites section 662 can include a list of contacts that the user of the first electronic device 102 has invited to join the system 100. An invitation can be sent to the contact requesting the contact to join the system 100. While the invitation is pending, the contact name can appear in the invites section 662. For example, FIG. 17 shows one contact in the invites section 662, while FIG. 18 shows two contacts in the invites section 662. When the contact joins the system 100, the contact name can automatically move from the invites section 662 to the friends section 656. In some embodiments, a password button 664 can be actuated to associate a unique password with each invitee in the invites section 662, requiring the invitee to enter the password to join the system 100. In some embodiments, the password button 664 can associate a unique password with the invitee, thereby requiring the contact to input the unique password into the system 100 to allow decryption. Each invitee or contact can have a button 666 associated with the name. Actuating the button 666 allows the user of the first electronic device 102 to unfriend or cancel the invitation of the contact, thereby removing the contact from the network associated with the user on the system 100.

The window 650 can further include an encryption settings section 668. The encryption settings section 668 can include a viewing rights section 670 and a decryption preference section 672. The viewing rights section 670 can include actuators 674, 676 that can be used to increase or decrease the number of times the encrypted electronic content 152 can be viewed. For example, although the viewing rights section 670 indicates that the encrypted electronic content 152 can be viewed four times, the actuator 674 can be used to increase the number of permitted views and the actuator 676 can be used to decrease the number of permitted views to the desired value.

In some embodiments, the viewing rights section 670 can include a section for increasing or decreasing the amount of time permitted for viewing the encrypted electronic content 152. For example, the viewing rights section 670 can include actuators substantially similar to the actuators 674, 676 for increasing or decreasing the amount of time permitted for viewing the encrypted electronic content 152.

In some embodiments, the encryption settings section 668 can include a section for selecting or limiting distribution rights of the encrypted electronic content 152. For example, the section can include actuators that increase or decrease the number of times the encrypted electronic content 152 can be distributed after being sent to the recipient.

In some embodiments, the encryption settings section 668 can include a section for selecting whether or not the recipient of the encrypted electronic content 152 can download the encrypted electronic content 152 to the recipient's electronic device. For example, the recipient can be allowed to download the encrypted electronic content 152 to the second electronic device 104. However, the viewing rights, distribution rights, and decryption methods can remain associated with the encrypted electronic content 152 after being downloaded to the second electronic device 104. Although shown as being selected prior to transmitting the encrypted electronic content 152, in some embodiments and as will be discussed in greater detail below, the system can include options to allow the user to adjust and/or apply the encryption settings of the encrypted electronic content 152 after the encrypted electronic content 152 has been transmitted to another electronic device.

The decryption preference section 672 can include be depressed to switch between a "Standard" decryption mode (e.g., FIG. 17) and an "Advanced" decryption mode (e.g., FIG. 18). For example, tapping the decryption preference section 672 can switch between the "Standard" and "Advanced" decryption modes. The "Standard" decryption mode can correspond to decryption being actuated by tapping/touching and holding a single point of the graphical user interface. The "Advanced" decryption mode can correspond to decryption being actuated by tapping/touching and holding four or more different points of the graphical user interface. Added security to the decryption process can thereby set prior to encryption to prevent the recipient from taking a screenshot of the hidden electronic content 148 after decryption.

Once the user has set one or both of the viewing rights and decryption method options, the continue button 678 can be actuated to save the encryption settings and return the user to an interface that allows selection and assignment of the first and second electronic content 124, 126 as the hidden and cover electronic content 148, 150. The viewing rights, distribution rights, download rights, and decryption methods can therefore be encrypted directly into the encrypted electronic content 152 and/or the decryption key 154.

If the encrypted electronic content 152 is saved locally on the first electronic device 102, the user can open the encrypted electronic content 152 in the system 100 to adjust the encryption settings at a future time. For example, the user can use one set of encryption settings when sending the encrypted electronic content 152 to a first contact, and can subsequently change the encryption settings prior to sending the encrypted electronic content 152 to a second contact. The new encryption settings can be encrypted into the encrypted electronic content 152 prior to sending the encrypted electronic content 152 to the second contact.

Figure 19:
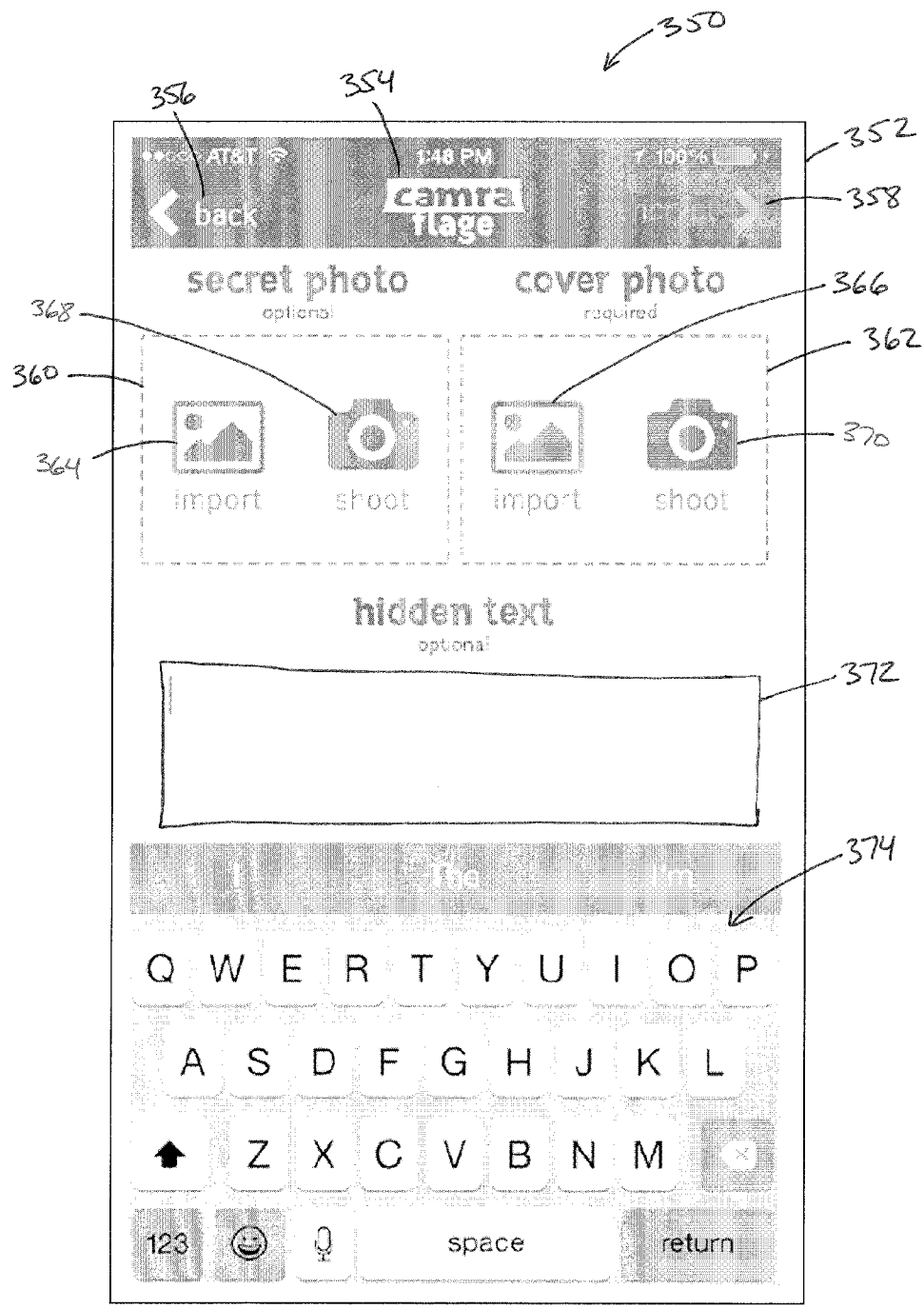
FIG. 19 is a graphical user interface window of an electronic content transformation system in accordance with embodiments of the present disclosure, which shows an assignment and encryption interface.
Figure 20:
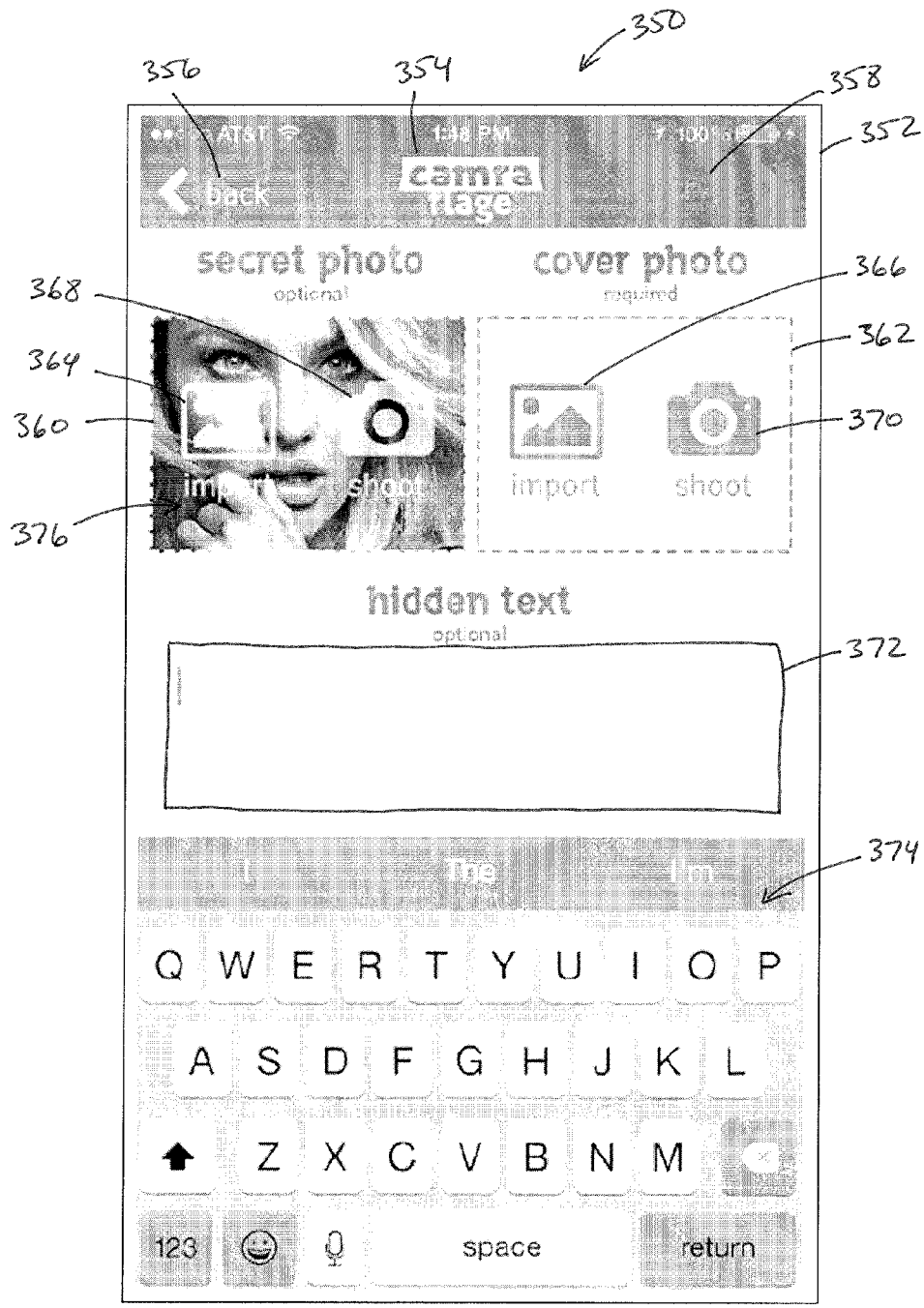
FIG. 20 is a graphical user interface window of an electronic content transformation system in accordance with embodiments of the present disclosure, which shows an assignment and encryption interface.
Figure 21:
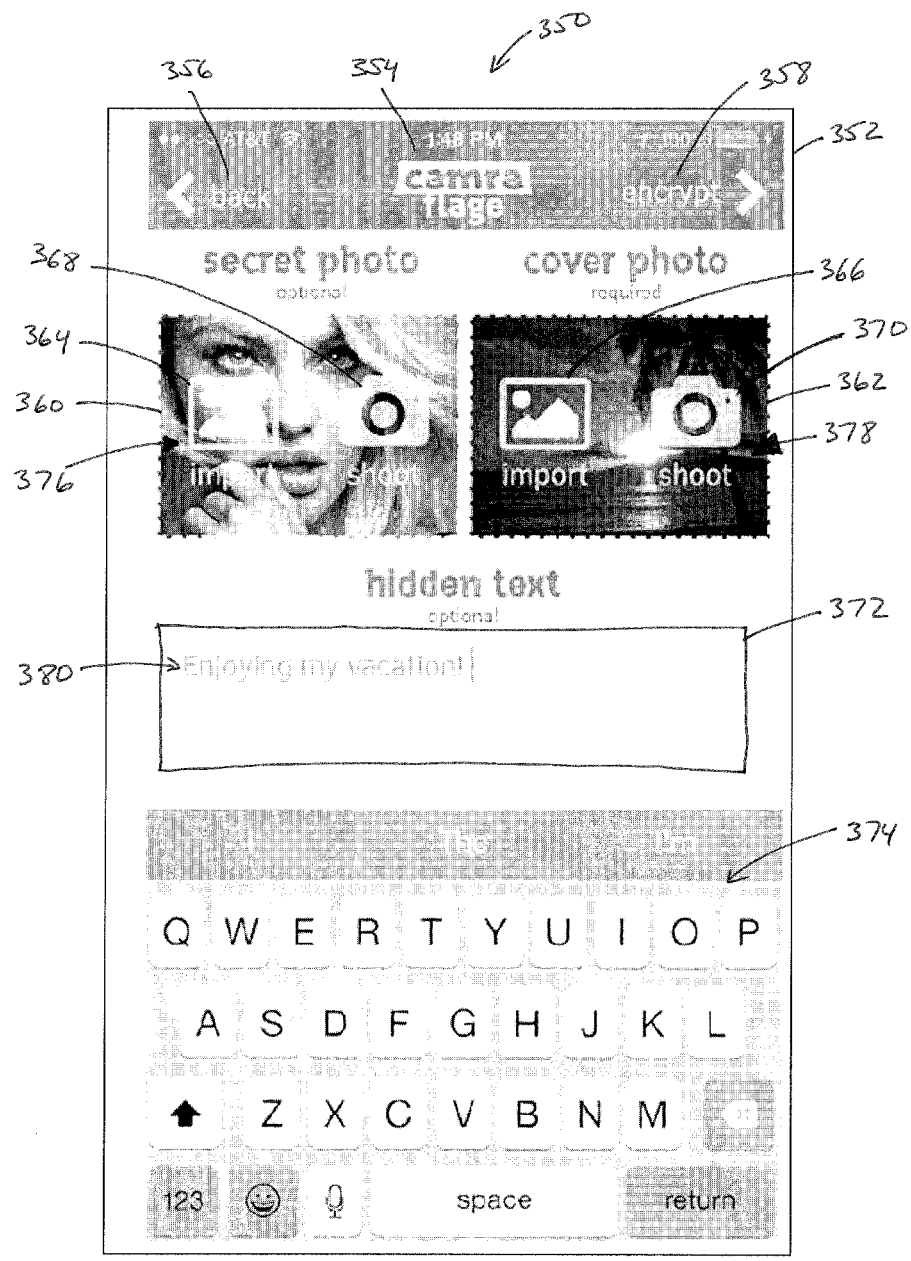
FIG. 21 is a graphical user interface window of an electronic content transformation system in accordance with embodiments of the present disclosure, which shows an assignment and encryption interface.

FIGS. 19-21 show an exemplary graphical user interface window 350 of the system 100 in accordance with embodiments of the present disclosure. In particular, the window 350 shows an assignment and encryption interface on the first electronic device 102 for assigning the first and second electronic content 124, 126 as the hidden and cover electronic content 148, 150, respectively, via the assignment engine 108. The first electronic device 102 is represented by the structure 352 in FIG. 19. The window 350 can include a title 354, e.g., CAMRAFLAGE™. The window 350 can include a back button 356 and an encrypt button 358. The back button 356 can be actuated to return to an opening or introduction screen (e.g., window 550 of FIG. 15) of the application. The encrypt button 358 can be actuated to execute the encryption engine 110 to generate the encrypted electronic content 152.

As shown in FIG. 19, the encrypt button 358 can be grayed out, i.e., cannot be actuated, until at least the second electronic content 126 to be designated as the cover electronic content 150 has been selected, thereby preventing a false start for the encryption process. In particular, in some embodiments, the system 100 can be used to encrypt only one electronic content, e.g., the second electronic content 126, to include distribution rights and/or viewing rights, without including a hidden electronic content 148 below the cover electronic content 150. Thus, only the cover electronic content 150 can be encrypted to include the distribution rights and/or viewing rights prior to sending the encrypted electronic content 152 to the second electronic device 104.

The window 350 can include a first selection section 360 and a second selection section 362. The first selection section 360 can be used to select or capture the first electronic content 124 to be designated as the secret or hidden electronic content 148. The second selection section 362 can be used to select or capture the second electronic content 126 to be designated as the cover electronic content 150. Each of the first and second selection sections 360, 362 can include an import button 364, 366 and a shoot or capture button 368, 370. The import buttons 364, 366 can be actuated to open an existing storage on the first electronic device 102 that contains electronic content saved therein. For example, actuating the import button 364, 366 can present the camera roll on the first electronic device 102 allowing the user to select one electronic content to use as the first electronic content 124. The capture buttons 368, 370 can be actuated to open a content capturing mechanism, e.g., a camera, on the first electronic device 102 to permit the user to capture a new electronic content via the content capturing mechanism.

The first and second electronic content 124, 126 can thereby be selected or captured by the user. Upon selecting or capturing the first electronic content 124 at the first selection section 360, the assignment engine 108 can designate the first electronic content 124 as the hidden electronic content 148 (see FIG. 20). In particular, FIG. 20 shows a photograph 376 selected as the first electronic content 124. Upon selecting or capturing the second electronic content 126 at the second selection section 362, the assignment engine 108 can designate the second electronic content 126 as the cover electronic content 150 (see FIG. 21). In particular, FIG. 21 shows a photograph 378 selected as the second electronic content 126. In some embodiments, the second selection section 362 can be used to select an one or more emoji to act as the cover electronic content 150 to cover all or portions of the hidden electronic content 148. The import and capture buttons 364-370 can remain superimposed over the respective photographs 376, 378 such that the user can use the import and capture buttons 364-370 to change the selections of the photographs 376, 378 prior to encryption.

Although illustrated as using two photographs 376, 378, it should be understood that different types of electronic content can be used in combination. For example, the first electronic content 124 can be a photograph and the second electronic content 126 can be a photograph, video or text. As a further example, the first electronic content 124 can be a video and the second electronic content 126 can be a photograph, video or text. As a further example, the first electronic content 124 can be a photograph, video or text and the second electronic content 126 can be a video. Thus, different combinations of electronic content can be used in the selection of the first and second electronic content 124, 126.

In some embodiments, the window 350 can include a text section 372 that can be used to input an alphanumeric text message to be sent with the encrypted electronic content 152. The window 350 can include an electronic input interface 374, e.g., a keyboard, for generating the alphanumeric text message in the text section 372. The user can therefore optionally include a message 380 with the encrypted electronic content 152 (see FIG. 21).

After the desired selections have been made in the window 350, the encrypt button 358 can be actuated to execute the encryption engine 110 to generate the encrypted electronic content 152. As noted above, the encryption engine 110 encrypts the first and second electronic content 124, 126 to generate the encrypted electronic content 152, and further incorporates the viewing rights, distribution rights, download rights, decryption preference, combinations thereof, or the like, into the encrypted electronic content 152. After encryption, any type of messaging interface can be used to share the encrypted electronic content 152 with others, e.g., iMessage®, short message service (SMS), e-mail, a messaging interface incorporated into the system 100, or the like.

Figure 22:
FIG. 22 is a graphical user interface window of an electronic content transformation system in accordance with embodiments of the present disclosure, which shows an electronic content storage interface.

FIG. 22 shows an exemplary graphical user interface window 400 of the system 100 in accordance with embodiments of the present disclosure. In particular, the window 400 shows an electronic content storage interface (e.g., the electronic content database 106, the electronic content database 132, or the like) on either the first or second electronic device 102, 104 represented by the structure 402. For example, after encryption, the encrypted electronic content 152 can be saved to the electronic content database 106 of the first electronic device 102 and/or can be sent via a communications network to the second electronic device 102. The encrypted electronic content 152 can be saved by the recipient in the electronic content database 132 (e.g., an electronic camera roll) on the second electronic device 104.

As an example, the interface of FIG. 22 shows an electronic camera roll of the second electronic device. The camera roll includes a plurality of electronic content 404 stored therein. The electronic content 404 can represent unencrypted, regular electronic content that does not include a hidden electronic content 148. FIG. 22 further shows the encrypted electronic content 152 saved to in the camera roll with the other electronic content 404. In the encrypted state, the encrypted electronic content 152 appears as only the cover electronic content 150 and there is no indication that there is a hidden electronic content 148 hidden below the cover electronic content 150. The encrypted electronic content 152 can therefore be saved among other electronic content 404 and kept in plain site without fear of undesired viewing of the hidden electronic content 148. The window 400 can be used to browse a variety of folders and subfolders to view electronic content saved on the device until the desired encrypted electronic content 152 is located.

The user can select the encrypted electronic content 152 from the camera roll for introduction into a decryption interface to execute the decryption function and view the hidden electronic content 148. In particular, the encrypted electronic content 152 can only be decrypted to expose the hidden electronic content 148 in the decryption interface. In contrast, opening or viewing the encrypted electronic content 152 in a regular electronic content viewer on the electronic device only allows viewing of the cover electronic content 150 without showing the hidden electronic content 148.

Figure 23:
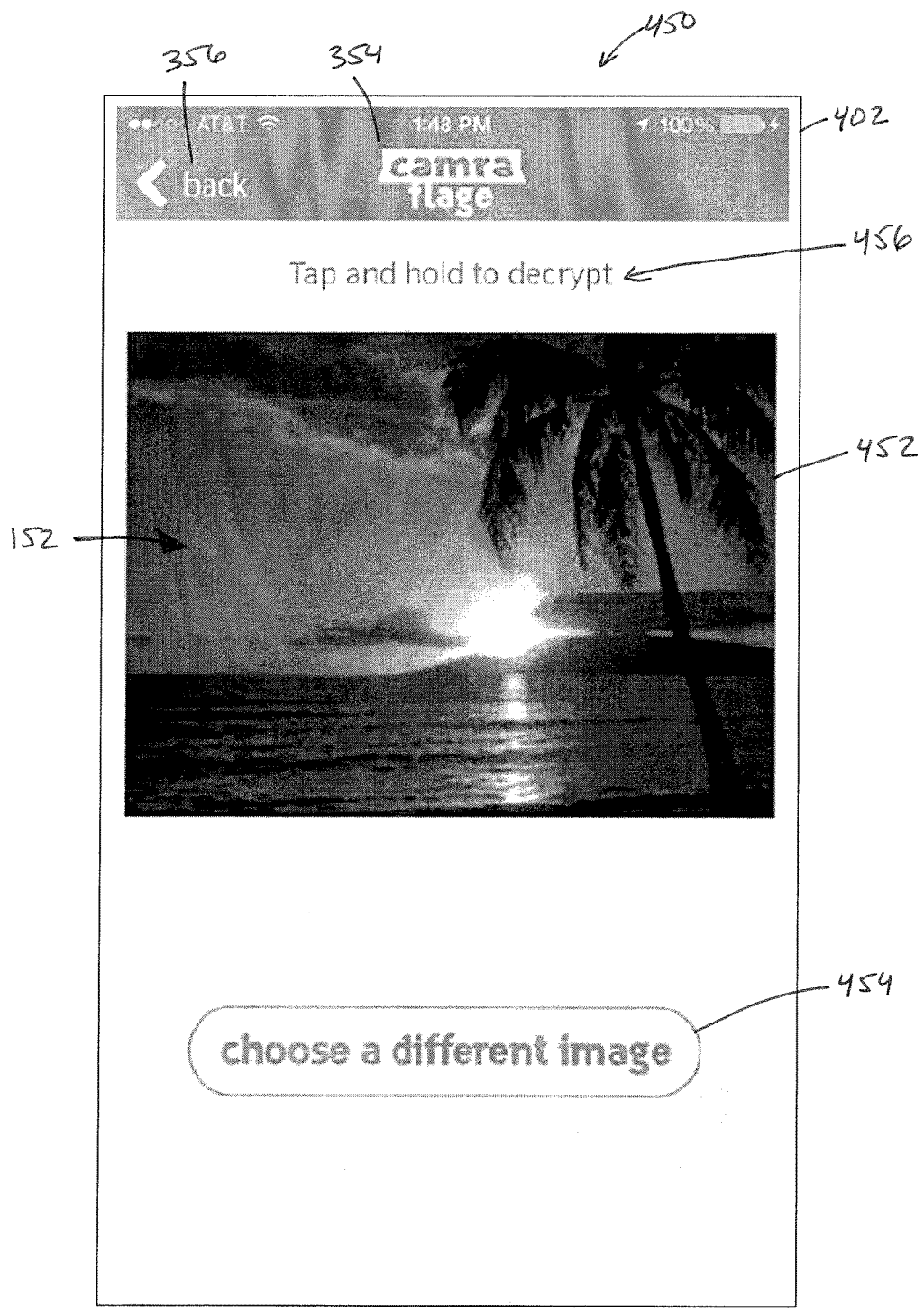
FIG. 23 is a graphical user interface window of an electronic content transformation system in accordance with embodiments of the present disclosure, which shows a decryption interface.

FIG. 23 shows an exemplary graphical user interface window 450 of the system 100 in accordance with embodiments of the present disclosure. In particular, the window 450 shows a decryption interface of the first and/or second electronic device 102, 104 in which the selected encrypted electronic content 152 can be decrypted. Similar to the window 350, the window 450 can include a title 354 and a back button 356 for returning to an opening or introduction window. Prior to decryption, the window 450 shows only the cover electronic content 150 (i.e., photograph 378) of the encrypted electronic content 152.

The window 450 can include a section 452 showing the selected encrypted electronic content 152 for decryption. The window 450 can include a button 454 that can be actuated to return to the window 400 to select a different encrypted electronic content 152 for decryption. The window 450 can include an instruction section 456 providing instructions to the user regarding actuation of the decryption engine 112, 134. For example, the instruction section 456 of FIG. 23 indicates that decryption can be initiated by tapping and holding the photograph, e.g., a physical input at one point on the GUI. If the user generating the encrypted electronic content 152 indicated a different decryption preference 151 (e.g., the "Advanced" decryption setting), the instruction section 456 could indicate the specific decryption instructions, e.g., tap and hold the photograph at four different points on the GUI. In some embodiments, the window 450 can include a section providing the time limit 158 and/or permitted views 160 associated with the encrypted electronic content 152.

In some embodiments, access to the interfaces associated with the system 100 can be password protected. For example, when downloading the application associated with the system 100 onto the device, the user can be prompted to create an account including at least a username and password. In some embodiments, one password or passcode can be entered at a log-in interface to permit decryption of the encrypted electronic content 152 via the window 450. In some embodiments, the system 100 can be protected by a double code system. For example, one password or passcode can permit decryption of the encrypted electronic content 152, while a second "decoy" passcode can allow encryption of the encrypted electronic content 152 while decryption of the encrypted electronic content 152 results in only the cover electronic content 150 being viewable. The system 100 can thereby be secretly used to view the hidden electronic content 148 with the use of the first password or passcode, while creating an appearance of no hidden electronic content 148 when the second "decoy" passcode is used. In some embodiments, the system 100 can include an emergency self-destruct passcode that can be used at the log-in interface to destroy all decryption keys associated with encrypted electronic content 152 stored on the device.

Figure 24:
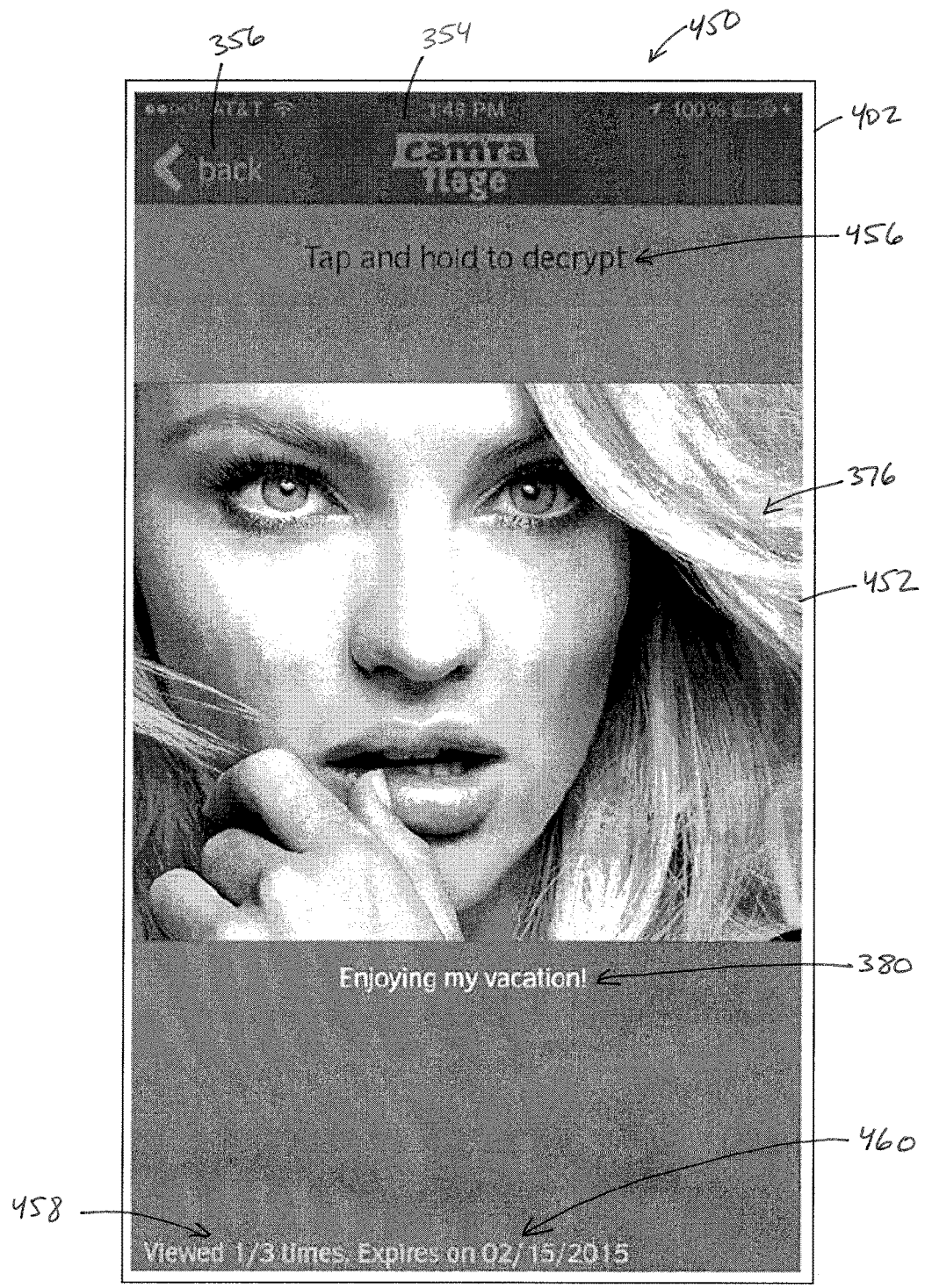
FIG. 24 is a graphical user interface window of an electronic content transformation system in accordance with embodiments of the present disclosure, which shows a decryption interface.

FIG. 24 shows the window 450 in a decrypted mode or configuration. In particular, when a user performs the instructions provided in the instruction section 456, the decryption engine 112, 134 can be executed to expose the hidden electronic content 148 (i.e., photograph 376). During decryption, the message 380 (if any) associated with the hidden electronic content 148 can also be shown. In some embodiments, during decryption, the area surrounding the section 452 and the message 380 can be grayed out to focus the attention of the user on the hidden electronic content 148.

FIG. 24 further shows a first notification 458 and a second notification 460. The first notification 458 indicates the permitted views 160 associated with the encrypted electronic content 152 and the second notification 460 indicates the time limit 158 associated with the encrypted electronic content 152. For example, the permitted views 160 shown in FIG. 24 is a maximum of three times and the first notification 458 indicates that the current viewing of the hidden electronic content 148 counts as one out of three times. As a further example, the time limit 158 shown in FIG. 24 is until Feb. 15, 2015.

Thus, with reference to the permitted views 160, if the user decrypts and exposes the hidden electronic content 148 three times, the self-destruct engine 138 can destroy, alter and/or remove the decryption key 154 such that the encrypted electronic content 152 can no longer be decrypted to expose the hidden electronic content 148. Similarly, with reference to the time limit 158, the self-destruct engine 138 can destroy, alter and/or remove the decryption key 154 upon the date reaching Feb. 15, 2015. As noted above, the first of the time limit 158 and the permitted views 160 reached by the user causes the self-destruct engine 138 to be executed. For example, if the user has only decrypted the encrypted electronic content 152 once and the date has reached Feb. 15, 2015, the self-destruct engine 138 is executed due to the time limit 158 viewing rights and the hidden electronic content 148 can no longer be viewed.

In some embodiments, the system 100 can include a video scrambling engine incorporated therein. For example, the video scrambling engine can be incorporated into the encryption engine 110 such that the video scrambling process occurs during encryption of the video content. The video scrambling engine can strip the indexing data associated with videos sent through the system 100 such that data from the temporary storage of the device cannot be obtained to view the video after the self-destruct engine 138 has been executed. In some embodiments, the video scrambling engine can strip the indexing data associated with the video sent while the recipient is watching the video.

Figure 25:
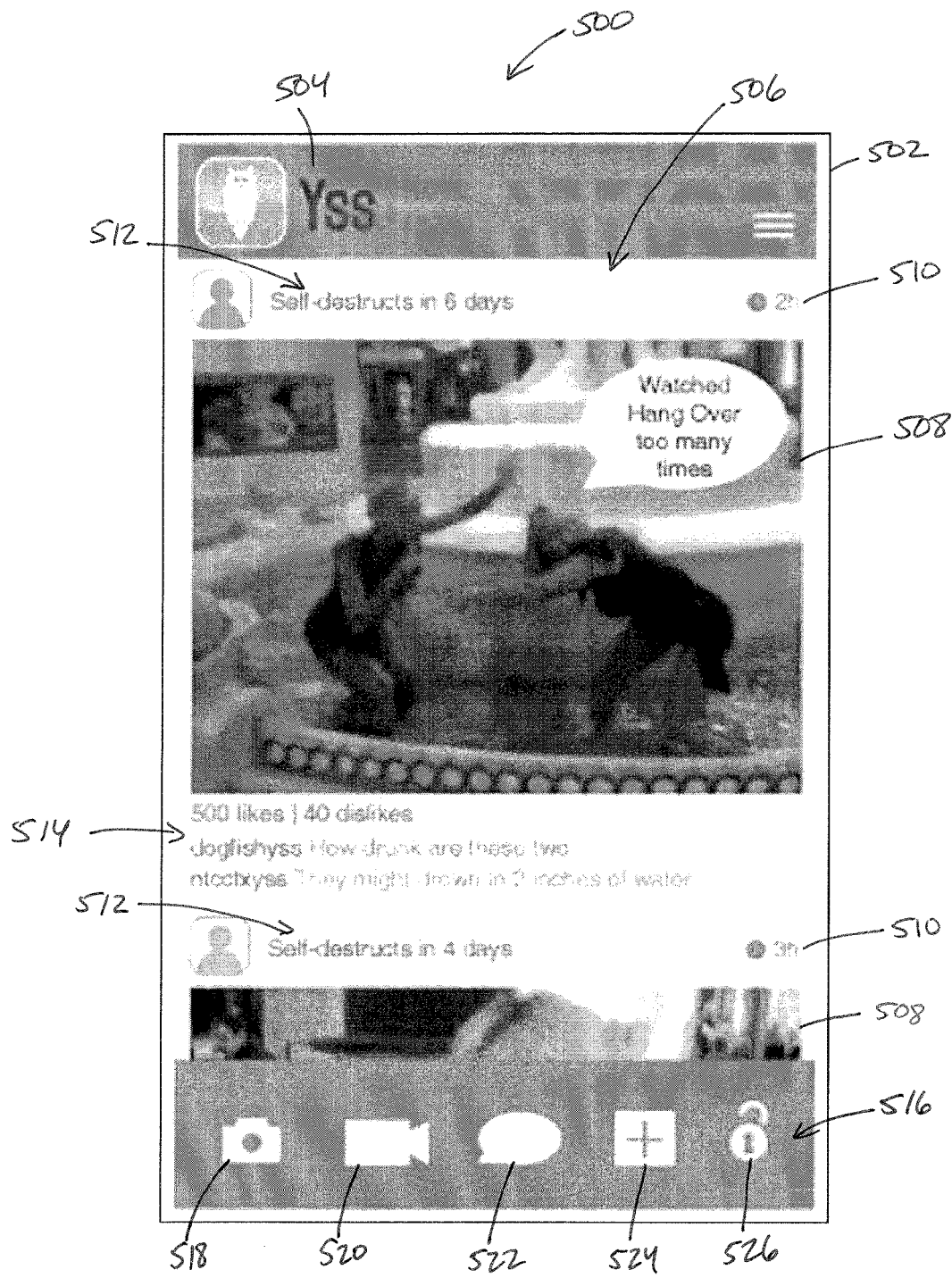
FIG. 25 is a graphical user interface window of an electronic content transformation system in accordance with embodiments of the present disclosure, which shows a social media interface.

In some embodiments, the system 100 can be used with an electronic or online dating platform such that encrypted and self-destructing messages, photographs and/or videos can be shared, thereby providing a higher level of security for online dating. In some embodiments, the system 100 can include a social media interface associated therewith as shown by the graphical user interface window 500 of FIG. 25. The window 500 can be viewed at the GUI 122, 142 of the first and/or second electronic devices 102, 104 as represented by the structure 502. The window 500 can include a title 504 of the social media interface. The window 500 can include an interactive page 506 in which one or more encrypted electronic content can be anonymously posted and shared with other participants of the social media interface. For example, the page 506 includes encrypted electronic content 508. Each encrypted electronic content 508 can include a time stamp 510 indicating a duration of time since the encrypted electronic content 508 was posted on the page 506.

Each encrypted electronic content 508 can further include a notification 512 indicating the time until the encrypted electronic content 508 will self-destruct. For example, the self-destruct engine 138 can automatically remove the encrypted electronic content 508 from the page 506 when the time for self-destruction is reached. In some embodiments, the encrypted electronic content 508 can be manually self-destructed and removed from the page 506 by the user who initially posted the encrypted electronic content 508.

Each encrypted electronic content 508 can also include a comment section 514 in which other users can comment on and/or "like" the encrypted electronic content 508. In some embodiments, the comment section 514 can be used in an anonymous manner. In some embodiments, the content of the comment section 514 can affect the position and/or the self-destruct status of the encrypted electronic content 508. For example, if the comment section 514 includes a large amount of "likes", the encrypted electronic content 508 can be moved to a higher position on the page 506. As a further example, if the comment section 514 includes a large amount of "dislikes", the encrypted electronic content 508 can be set to self-destruct and be removed from the page 506 in a quicker period of time.

In some embodiments, the window 500 can include a commands section 516. The first command 518 can provide access to a camera of the electronic device to create electronic content in the form of a photograph. The second command 520 can provide access to a camera of the electronic device to create electronic content in the form of a video. The third command 522 can provide access to a chat or messaging inbox, allowing the user to access messages sent from contacts and/or send messages to contacts. The fourth command 524 allows the user to add new friends or contacts. The fifth command 526 provides access to the interfaces discussed above for accessing and decrypting hidden electronic content stored locally on the electronic device (e.g., in the camera roll).

Figure 26:
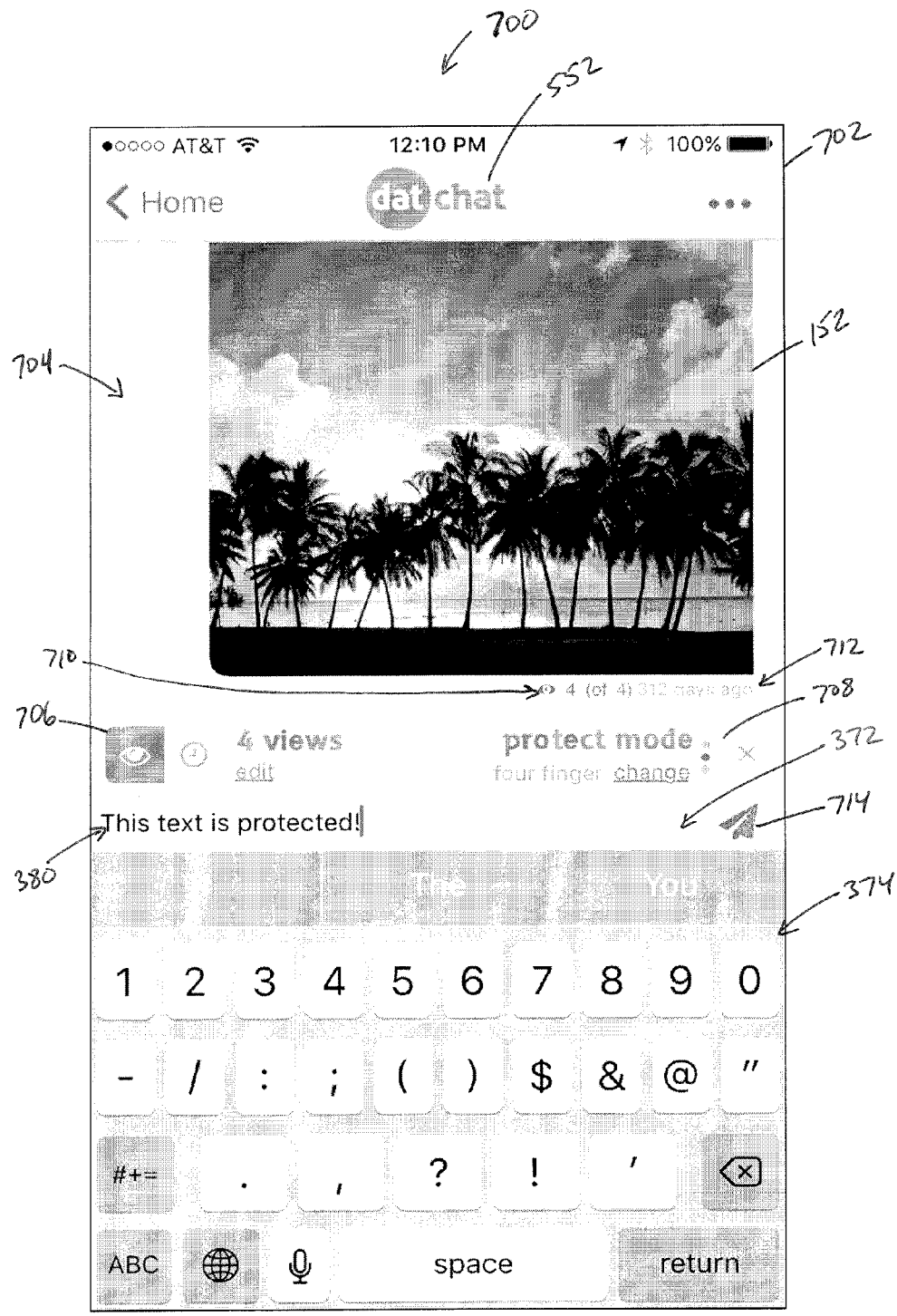
FIG. 26 is a graphical user interface window of an electronic content transformation system in accordance with embodiments of the present disclosure, which shows a sending interface.

FIG. 26 shows an exemplary graphical user interface window 700 of the system 100 in accordance with embodiments of the present disclosure. In particular, the window 700 shows a sending interface for selecting settings prior to sending the encrypted electronic content 152 on either the first or second electronic device 102, 104 represented by the structure 702. The window 700 generally includes a communication section 704 that displays the content to be send to another electronic device, such as the encrypted electronic content 152 and/or a message 380 typed in a text section 372. The communication section 704 can display an ongoing conversation between two electronic devices over an extended period of time.

In some embodiments, the sending interface window 700 can include a viewing rights section 706 and a decryption preference section 708 such that the user can set the desired security settings prior to sending the encrypted electronic content 152. In some embodiments, the window 700 can be used to adjust the security settings for the encrypted electronic content 152 after the encrypted electronic content 152 has already been sent to another electronic device. For example, the encrypted electronic content 152 can be stored in the camera roll window 400 of an electronic device as shown in FIG. 22 with the original security settings chosen by the user. The user can select the encrypted electronic content 152 from the camera roll window 400 through the sending interface window 700. The communication section 704 can indicate the number of views 710 of the encrypted electronic content 152 and the time period 712 since the encrypted electronic content 152 was originally sent. To adjust the number of permitted views, the user can select the viewing rights section 706. To adjust the level of security desired, the user can select the decryption preference section 708. As shown in FIG. 26, the security setting is set to "four fingers". After the desired settings have been selected, the user can actuate the send button 714 to send the encrypted electronic content 152 to another electronic device.

Figure 27:
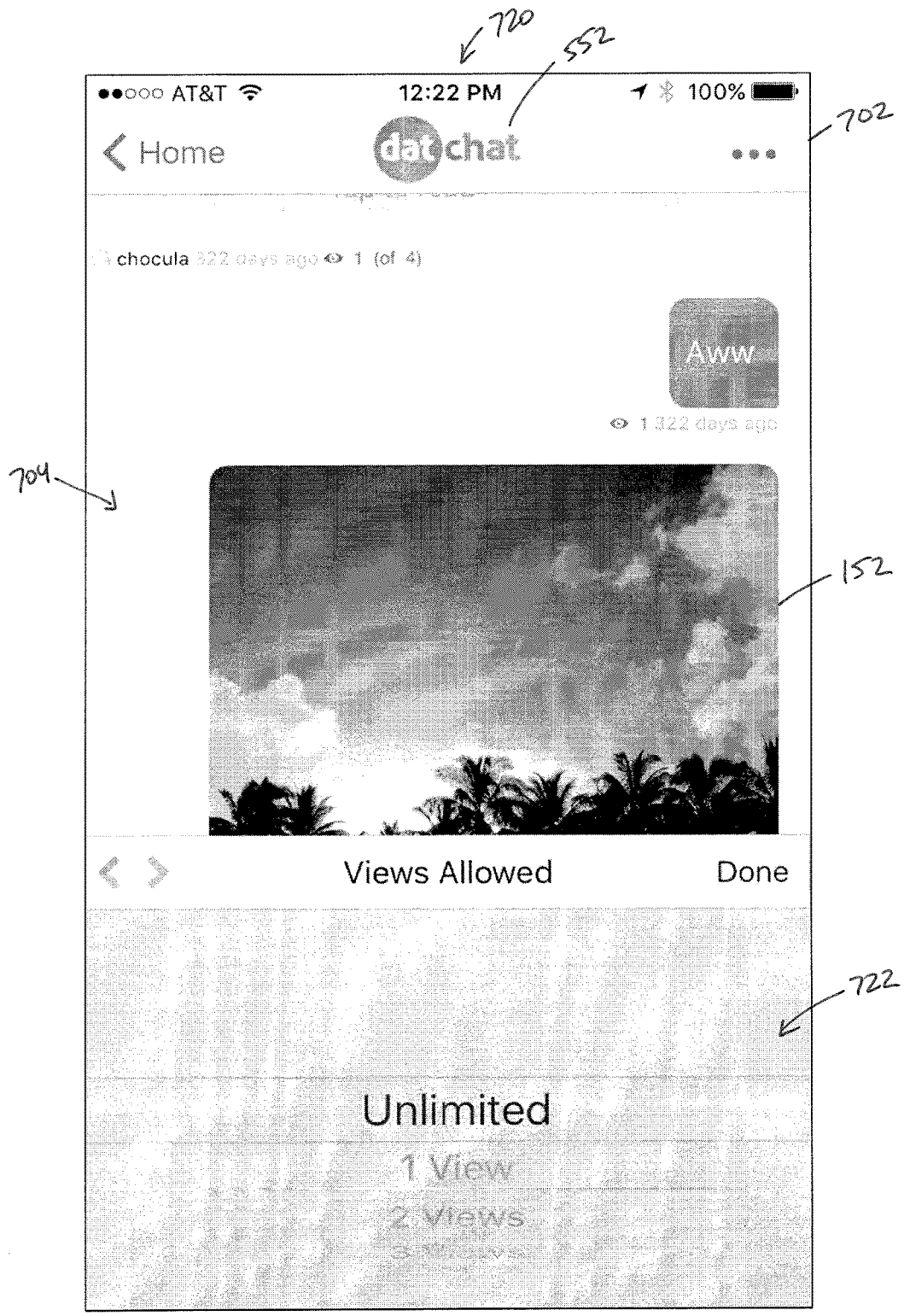
FIG. 27 is a graphical user interface window of an electronic content transformation system in accordance with embodiments of the present disclosure, which shows a viewing rights interface.

FIG. 27 shows an exemplary graphical user interface window 720 of the system 100 in accordance with embodiments of the present disclosure. In particular, the window 720 shows a viewing right interface for selecting the number of views allowed of the encrypted electronic content 152 to be sent to another electronic device. The window 720 includes a selection section 722 that allows the user to select the desired number of views of the encrypted electronic content 152. As shown in FIG. 27, the user can select an unlimited number of views or can set a predetermined numerical limit to the number of views of the encrypted electronic content 152.

Figure 28:
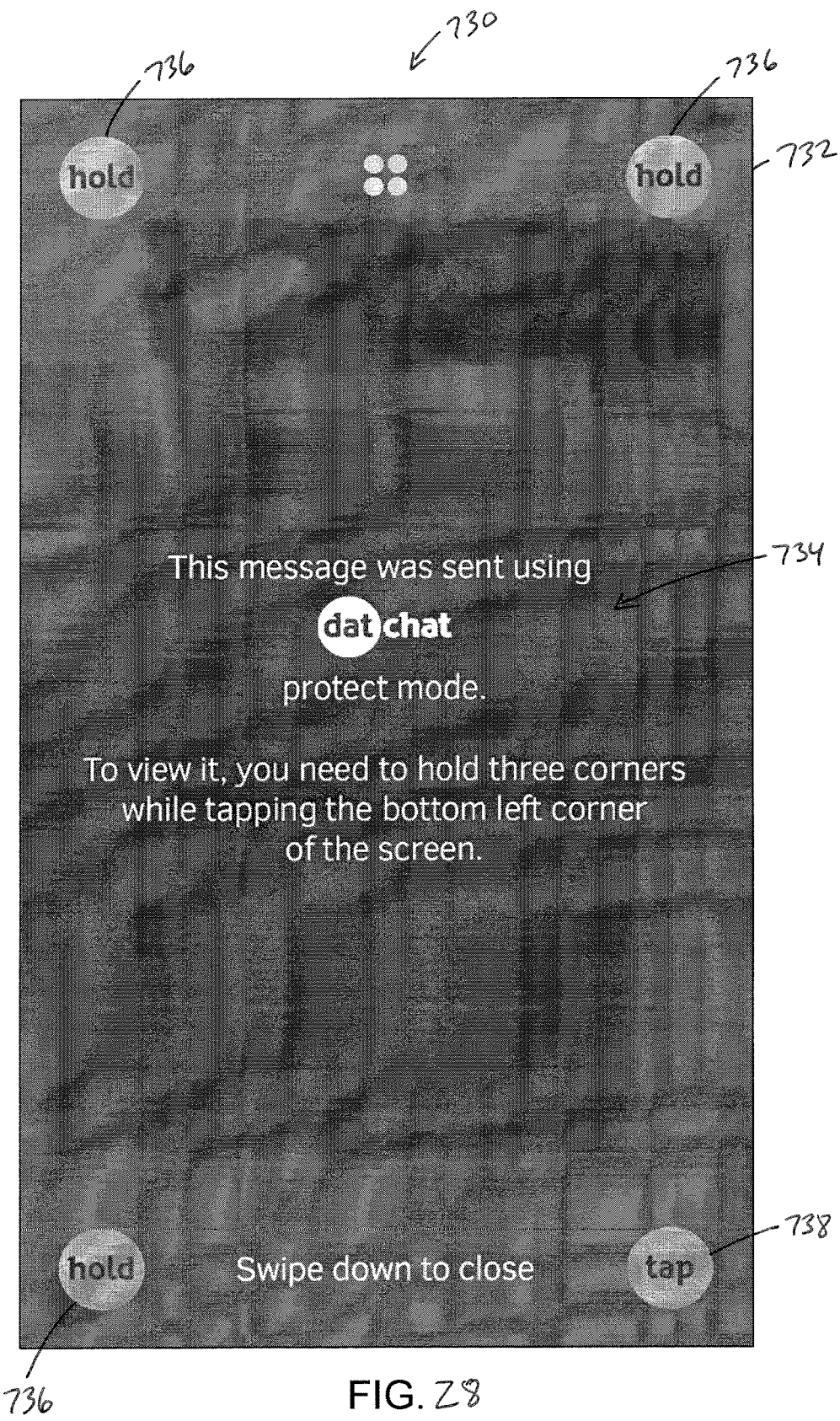
FIG. 28 is a graphical user interface window of an electronic content transformation system in accordance with embodiments of the present disclosure, which shows a receiving interface.

FIG. 28 shows an exemplary graphical user interface window 730 of the system 100 in accordance with embodiments of the present disclosure. In particular, the window 730 shows a receiving interface on an electronic device that receives the encrypted electronic content 152. The window 730 includes an instruction section 734 that explains that the encrypted electronic content 152 was sent in with a security level and explains how the encrypted electronic content 152 is to be decrypted. Based on the advanced "four finger" decryption preference selected in FIG. 26, the instruction section 734 states that for decryption, the user must hold three corners while tapping a fourth corner of the screen of the electronic device. Three corners of the window 730 include markers 736 indicating where the user must hold or depress the fingers, and one corner of the window 730 includes a marker 738 where the user must tap the corner with a finger. The advanced decryption setting reduces the opportunity for the user viewing the encrypted electronic content 152 to take a screenshot of the encrypted electronic content 152 after it has been decrypted. In some embodiments, if a user decrypting the encrypted electronic content 152 attempts to take a screenshot during the decryption process, an automatic notification can be transmitted to the sender of the encrypted electronic content 152 indicating the attempt. This notification allows the sender of the encrypted electronic content 152 to perform certain actions described below to ensure security of the encrypted electronic content 152.

Figure 29:
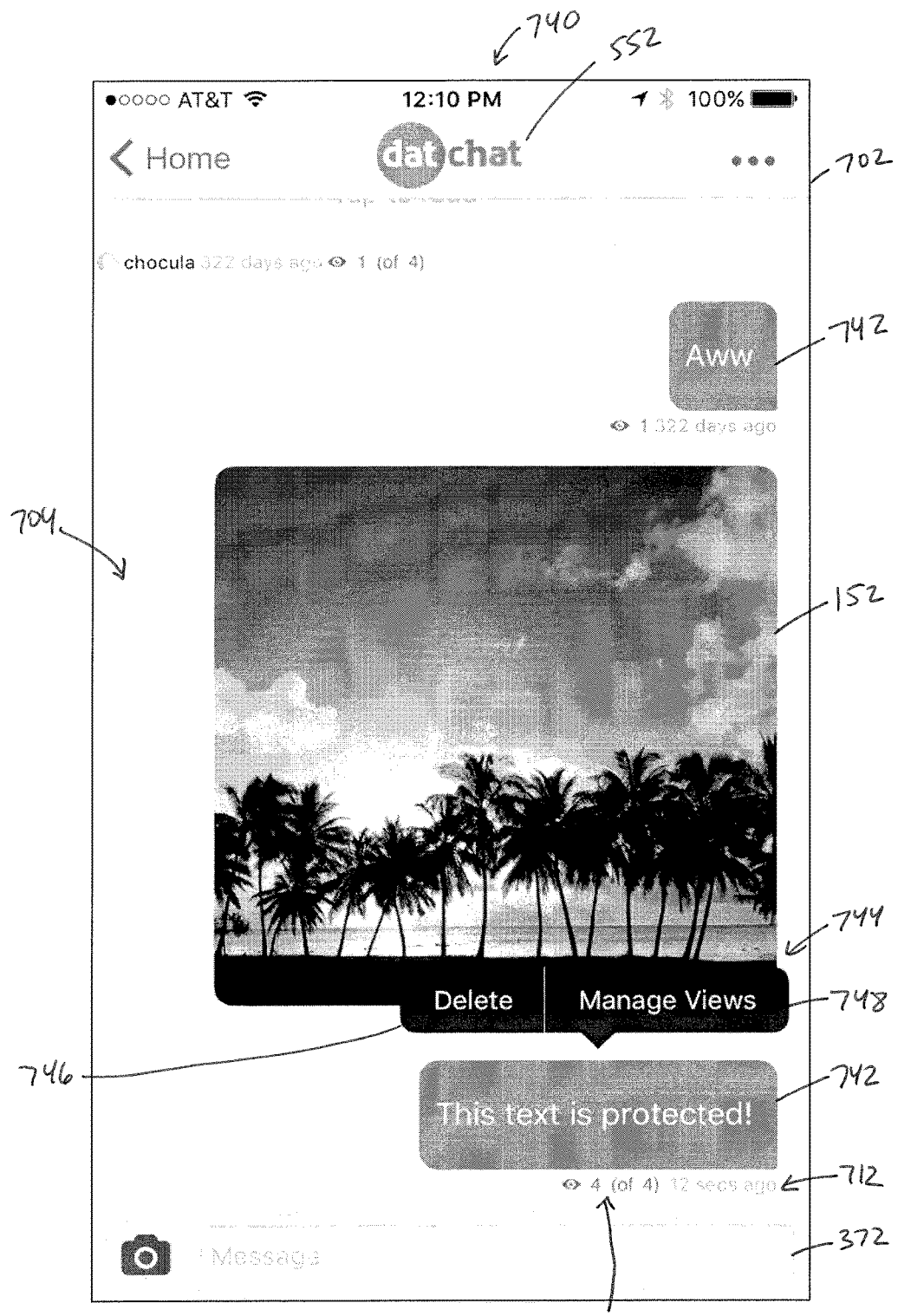
FIG. 29 is a graphical user interface window of an electronic content transformation system in accordance with embodiments of the present disclosure, which shows a communication interface.

FIG. 29 shows an exemplary graphical user interface window 740 of the system 100 in accordance with embodiments of the present disclosure. In particular, the window 740 shows a communication interface for adjusting encryption settings of encrypted electronic content 152 after it has been transmitted to another electronic device. In particular, the user can initially apply a certain set of encryption settings to the encrypted electronic content 152 and transmit the encrypted electronic content 152 to another electronic device and, at a later time, can adjust the encryption settings of the already sent encrypted electronic content 152 via the window 740.

Thus, while the sent encrypted electronic content 152 can initially be ephemeral (e.g., have limited viewing rights, advanced decryption settings, or the like), the user who initially sent the encrypted electronic content 152 can adjust the security settings at a later time to change the encrypted electronic content 152 to regular or permanent electronic content (e.g., without viewing rights, decryption requirements, or the like). It should be understood that a similar change in security settings can be made when the content was originally sent as regular or permanent electronic content, and the user decides to change the electronic content to ephemeral at a later time. In some embodiments, swiping on the encrypted electronic content 152 and/or a message 742 associated with the encrypted electronic content 152 in the communication section 704 opens a menu 744 in which the user can either delete 746 the content or open a submenu for managing permitted views 748.

Figure 30:
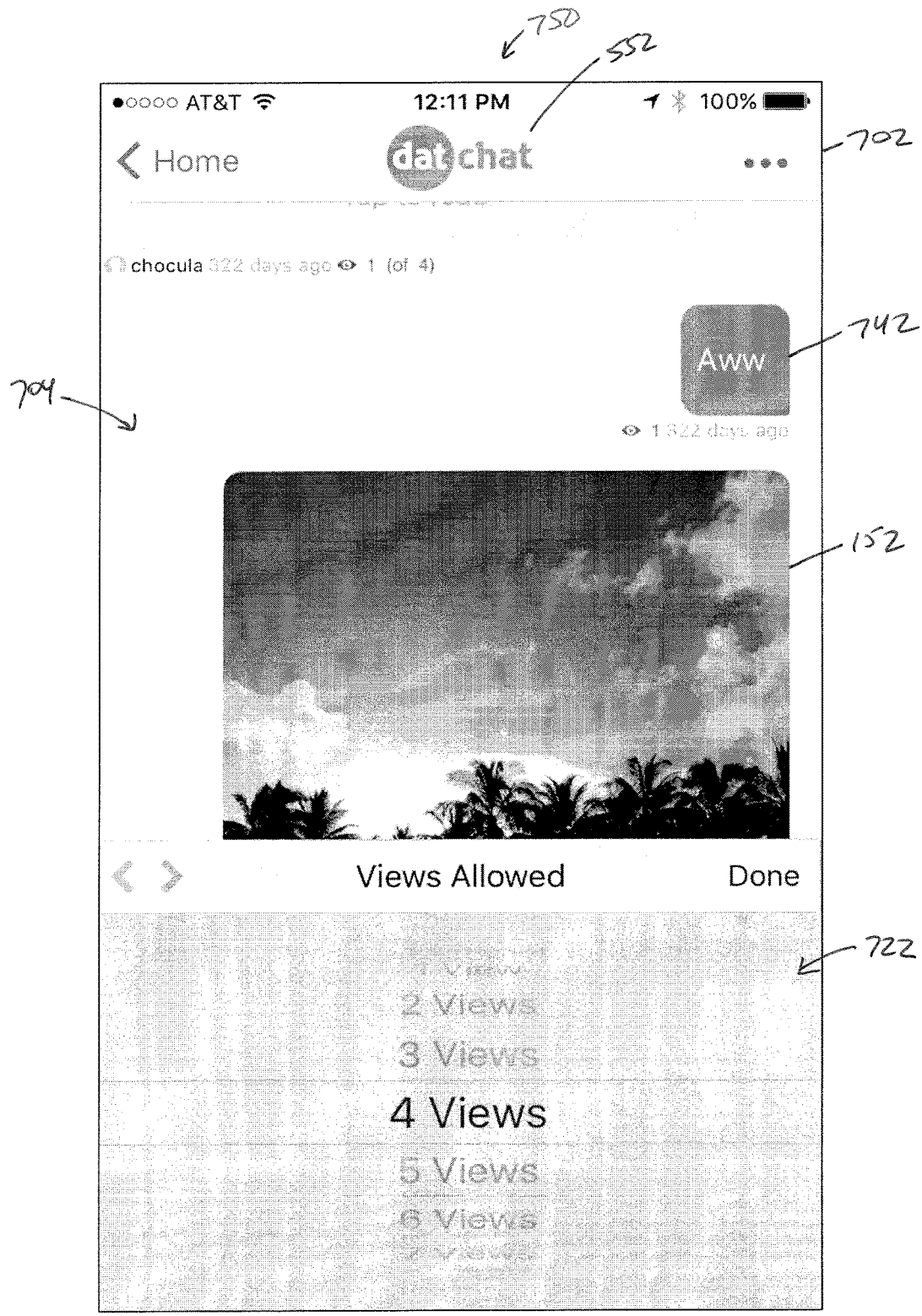
FIG. 30 is a graphical user interface window of an electronic content transformation system in accordance with embodiments of the present disclosure, which shows a viewing rights interface.

FIG. 30 shows an exemplary graphical user interface window 750 of the system 100 in accordance with embodiments of the present disclosure. In particular, the window 750 shows a viewing rights interface opened after the encrypted electronic content 152 has been sent to another electronic device. In the window 750, the selection section 722 can be used to adjust the allowed number of permitted views of the encrypted electronic content 152. For example, the allowed number of permitted views can be adjusted from unlimited to a specific numerical value, or from a specific numerical value to unlimited. Thus, the viewing rights can be adjusted after the encrypted electronic content 152 has been transmitted to another electronic device. A similar adjustment can be made in a decryption preference menu, allowing the user to adjust the decryption setting after the encrypted electronic content 152 has been transmitted to another electronic device.

Figure 31:
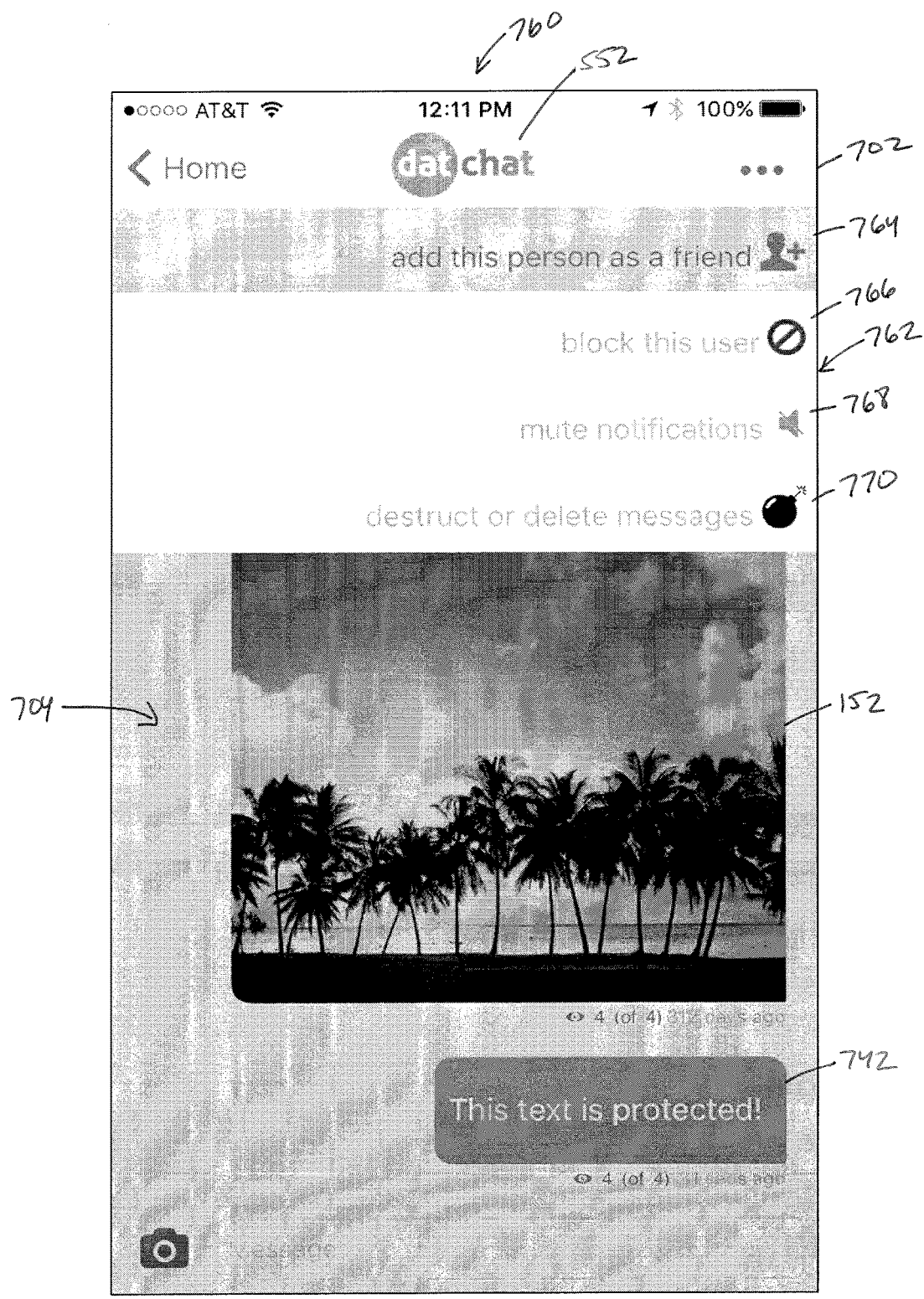
FIG. 31 is a graphical user interface window of an electronic content transformation system in accordance with embodiments of the present disclosure, which shows a message destruction interface.

In some embodiments, after the encrypted electronic content 152 has been transmitted to another electronic device, for security purposes, the sender may wish to delete some or all of the encrypted electronic content 152 and/or text 742 previously transmitted to the other electronic device. FIG. 31 shows an exemplary graphical user interface window 760 of the system 100 in accordance with embodiments of the present disclosure. In particular, the window 760 shows a message destruction interface for deleting all or some of the electronic content transmitted to another electronic device. The window 760 includes a selection menu 762 with options to add the contact as a friend 764, block a user 766, mute notifications 768 from a user, or destruct or delete 770 all or some of the electronic content previously transmitted to another electronic device and displayed in the communication section 704.

Figure 32:
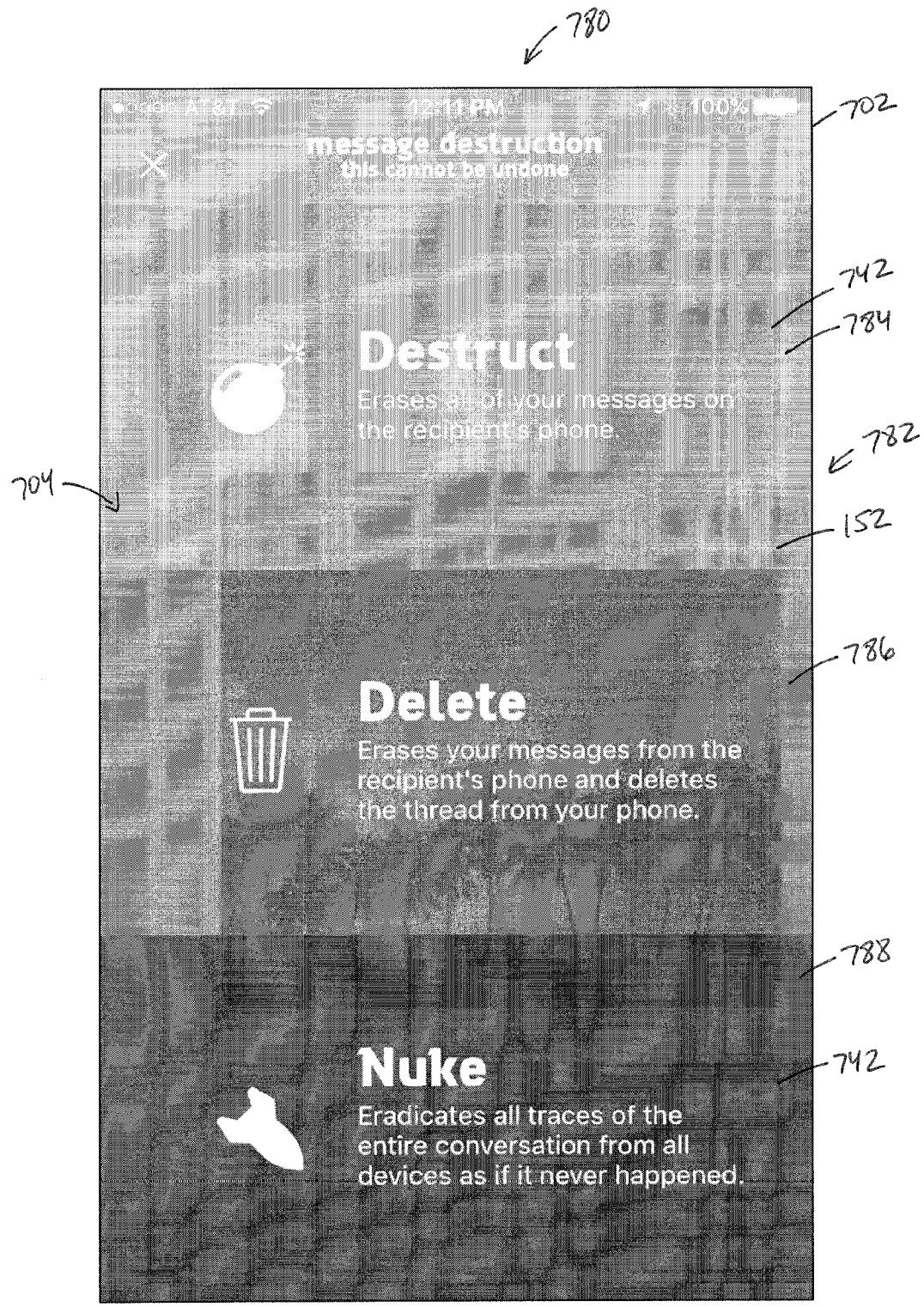
FIG. 32 is a graphical user interface window of an electronic content transformation system in accordance with embodiments of the present disclosure, which shows a message destruction interface menu.

Upon selection of the destruct or delete 770 button in the selection menu 762 of FIG. 31, the message destruction interface menu can be displayed. FIG. 32 shows an exemplary graphical user interface window 780 of the system 100 in accordance with embodiments of the present disclosure. In particular, the window 780 shows the message destruction interface menu 782 with options for the user to choose from. The message destruction interface menu 782 can overlay the communication section 704 such that the user can at least partially see the encrypted electronic content 152 and/or text 742 transmitted to the other electronic device.

Option one 784 in the message destruction interface menu 782 can be a destruct function to erase all of the electronic content and/or messages transmitted to the other electronic device. Option two 786 in the message destruction interface menu 782 can be a delete function to erase all of the electronic content and/or messages transmitted to the other electronic devices and the thread of messages on the sender's electronic device. Option three 788 in the message destruction interface menu 782 can be a nuke function to eradicate all traces of the entire conversation from all electronic devices as if the transmissions never occurred.

Figure 33:
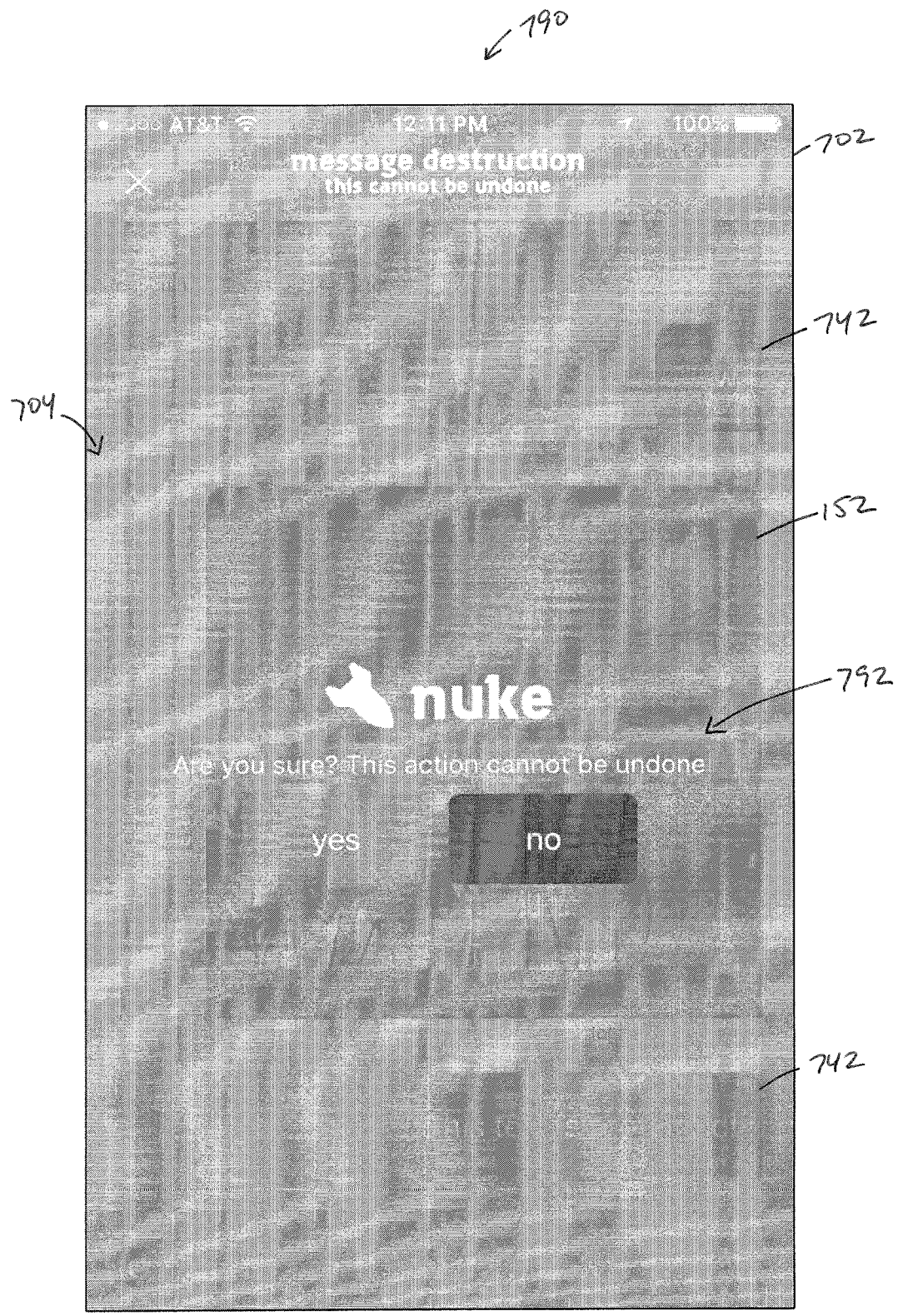
FIG. 33 is a graphical user interface window of an electronic content transformation system in accordance with embodiments of the present disclosure, which shows a message destruction interface confirmation.

Upon selecting option three 788 from the message destruction interface menu 782, the message destruction interface confirmation window can be displayed. FIG. 33 shows an exemplary graphical user interface window 790 of the system 100 in accordance with embodiments of the present disclosure. In particular, the window 790 shows the message destruction interface confirmation 792 requesting the user to confirm to delete all traces of electronic transmissions between the electronic devices.

By allowing the user to manage the security settings of the electronic content after the electronic content has been transmitted to other electronic devices, the sender is ensured that the electronic content will not remain with undesired recipients. The sender of the electronic content can therefore determine whether the electronic content will last forever with unlimited views or automatically self-destruct after a certain number of views. Any time after sending the electronic content, the sender can delete the electronic transmissions and content from the recipient's electronic device, adjust the decryption settings, or allow the recipient additional time to view the electronic content. The sender can also choose to change the rights or delete a single electronic content or perform the actions for multiple (or all) of the electronic content transmitted to other electronic devices. The "nuke" option further allows the sender to delete all traces of the electronic communication between the electronic devices on both the sender and recipient's electronic device.

The exemplary systems and methods discussed herein advantageously provide a means of transforming electronic content on a device in a way that provides security for the electronic content saved on the device and/or shared with other users. Electronic content can therefore be saved in a hidden manner on a device without fear of others accidentally viewing secret data. Similarly, electronic content can be shared with others in a confidential manner and with a means of limiting distribution and/or viewing rights of the shared electronic content.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of transforming electronic content, the method comprising:
electronically capturing or receiving a first electronic content and a second electronic content with a first electronic device;

executing an assignment function to designate the first electronic content as a hidden electronic content and to designate the second electronic content as a cover electronic content; and executing an encryption function that receives as input the hidden electronic content and the cover electronic content, and that outputs an encrypted electronic content and a decryption key;

wherein the encrypted electronic content includes the cover electronic content overlaid over the entire hidden electronic content such that, prior to decryption, only the cover electronic content is viewable at a location of a graphical user interface;

wherein in the encrypted state, the encrypted electronic content appears as only the cover electronic content without visually indicating encryption and without visually indicating that the hidden electronic content is hidden below the cover electronic content; and wherein execution of the encryption function allows for selection of encryption settings and decryption settings associated with the encrypted electronic content, the encryption settings including at least one of viewing rights, distribution rights, or decryption methods.

2. The method of claim 1, wherein the first electronic content and the second electronic content are at least one of a photograph, a video, or a text.

3. The method of claim 1, further comprising executing a transmission function to transmit the encrypted electronic content and the decryption key to a second electronic device, the second electronic device including a graphical user interface.

4. The method of claim 3, further comprising executing on the second electronic device a decryption function that receives as input the encrypted electronic content and the decryption key, and that outputs the hidden electronic content to the second electronic device.

5. The method of claim 4, wherein executing the decryption function to output the hidden electronic content comprises providing a physical input from a user on the graphical user interface of the second electronic device.

6. The method of claim 5, wherein the physical input from the user comprises a touch and hold at a single point on the graphical user interface.

7. The method of claim 5, wherein the physical input from the user comprises a simultaneous touch and hold at two or more different points on the graphical user interface.

8. The method of claim 1, further comprising storing the encrypted electronic content in an electronic content database associated with the first electronic device, the encrypted electronic content being viewable on the graphical user interface of the first electronic device at a second location.

9. The method of claim 1, further comprising executing a distribution rights function to assign the distribution rights to the encrypted electronic content.

10. The method of claim 9, further comprising executing a transmission function to transmit the encrypted electronic content to a second electronic device, the distribution rights limiting or preventing distribution of the encrypted electronic content from the second electronic device to a third electronic device.

11. The method of claim 1, further comprising executing a viewing rights function to assign viewing rights to the encrypted electronic content.

12. The method of claim 11, wherein the viewing rights designate at least one of (i) a time limit for viewing the encrypted electronic content, or (ii) a number of permitted views of the encrypted electronic content.

13. The method of claim 12, further comprising executing a self-destruct function upon reaching at least one of (i) the time limit, or (ii) the number of permitted views, the self-destruct function comprising removing or altering the decryption key associated with the encrypted electronic content to prevent decryption of the encrypted electronic content, wherein executing the self-destruct function permanently prevents viewing the hidden electronic content via the graphical user interface, while permitting viewing of the cover electronic content.

14. A non-transitory computer-readable medium storing instructions that are executable by a processing device, wherein execution of the instructions by the processing device causes the processing device to:

electronically capture or receive a first electronic content and a second electronic content with a first electronic device;

execute an assignment function to designate the first electronic content as a hidden electronic content and to designate the second electronic content as a cover electronic content; and execute an encryption function that receives as input the hidden electronic content and the cover electronic content, and that outputs an encrypted electronic content and a decryption key;

wherein the encrypted electronic content includes the cover electronic content overlaid over the entire hidden electronic content such that, prior to decryption, only the cover electronic content is viewable at a location of a graphical user interface;

wherein in the encrypted state, the encrypted electronic content appears as only the cover electronic content without visually indicating encryption and without visually indicating that the hidden electronic content is hidden below the cover electronic content; and wherein execution of the encryption function allows for selection of encryption settings and decryption settings associated with the encrypted electronic content, the encryption settings including at least one of viewing rights, distribution rights, or decryption methods.

15. A system of transforming electronic content, the system comprising:

a first electronic device including a first graphical user interface, a first non-transitory computer-readable medium, and a first processing device; and a second electronic device including a second graphical user interface, a second non-transitory computer-readable medium, and a second processing device;

wherein the first processing device of the first electronic device is configured to execute instructions stored in the first non-transitory computer-readable medium to:

electronically capture or receive a first electronic content and a second electronic content with the first electronic device;

execute an assignment function to designate the first electronic content as a hidden electronic content and to designate the second electronic content as a cover electronic content;

execute an encryption function that receives as input the hidden electronic content and the cover electronic content, and that outputs an encrypted electronic content and a decryption key, wherein the encrypted electronic content includes the cover electronic content overlaid over the entire hidden electronic content such that, prior to decryption, only the cover electronic content is viewable at a location of a graphical user interface, wherein in the encrypted state, the encrypted electronic content appears as only the cover electronic content without visually indicating encryption and without visually indicating that the hidden electronic content is hidden below the cover electronic content, and wherein execution of the encryption function allows for selection of encryption settings and decryption settings associated with the encrypted electronic content, the encryption settings including at least one of viewing rights, distribution rights, or decryption methods; and execute a transmission function to transmit the encrypted electronic content and the decryption key to the second electronic device;

wherein the second processing device of the second electronic device is configured to execute instructions stored in the second non-transitory computer-readable medium to:

electronically receive the encrypted electronic content and the decryption key from the first electronic device; and execute a decryption function that receives as input the encrypted electronic content and the decryption key, and that outputs the hidden electronic content.

16. The system of claim 15, wherein the first processing device of the first electronic device is configured to execute instructions stored in the first non-transitory computer-readable medium to execute a distribution rights function to assign the distribution rights to the encrypted electronic content, the distribution rights limiting or preventing distribution of the encrypted electronic content from the second electronic device to a third electronic device.

17. The system of claim 15, wherein the first processing device of the first electronic device is configured to execute instructions stored in the first non-transitory computer-readable medium to execute a viewing rights function to assign the viewing rights to the encrypted electronic content.

18. The system of claim 15, wherein the first processing device of the first electronic device is configured to execute instructions stored in the first non-transitory computer-readable medium to alter a type of decryption for execution of the decryption function after the encrypted electronic content has been transmitted to the second electronic device.

19. The system of claim 15, wherein the first processing device of the first electronic device is configured to execute instructions stored in the first non-transitory computer-readable medium to delete the encrypted electronic content from the second electronic device after the encrypted electronic content has been transmitted to the second electronic device.

20. The system of claim 17, wherein the first processing device of the first electronic device is configured to execute instructions stored in the first non-transitory computer-readable medium to alter the assigned viewing rights of the encrypted electronic content after the encrypted electronic content has been transmitted to the second electronic device.

21. The method of claim 5, wherein the physical input from the user comprises a simultaneous touch and hold at four different points on the graphical user interface.

22. The method of claim 21, wherein the graphical user interface comprises markers indicating four separate locations at which the user is to simultaneously touch and hold at the four different points on the graphical user interface.

23. The method of claim 5, wherein the physical input from the user comprises a simultaneous touch and hold at three different points on the graphical user interface, and a touch and tap at a fourth point on the graphical user interface.

* * * * *